United States Patent
Soejima et al.

(10) Patent No.: US 7,415,587 B2
(45) Date of Patent: Aug. 19, 2008

(54) METHOD AND APPARATUS FOR ADJUSTING PERFORMANCE OF LOGICAL VOLUME COPY DESTINATION

(75) Inventors: Kenichi Soejima, Odawara (JP); Satoshi Miyazaki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/377,576

(22) Filed: Mar. 17, 2006

(65) Prior Publication Data

US 2006/0179220 A1 Aug. 10, 2006

Related U.S. Application Data

(63) Continuation of application No. 10/651,166, filed on Aug. 29, 2003, now Pat. No. 7,047,360.

(30) Foreign Application Priority Data

| Dec. 20, 2002 | (JP) | ............................. 2002-369324 |
| May 9, 2003 | (JP) | ............................. 2003-130984 |

(51) Int. Cl.
*G06F 12/00* (2006.01)
*G06F 13/00* (2006.01)
*G06F 11/07* (2006.01)

(52) U.S. Cl. ...................... 711/162; 711/112; 711/114; 711/170; 714/5; 714/6; 714/7

(58) Field of Classification Search ................. 711/112, 711/114, 162, 170; 714/5, 6, 7
See application file for complete search history.

(56) References Cited

U.S. PATENT DOCUMENTS 4,683,533 A * 7/1987 Shiozaki et al. ............. 709/213

(Continued)

FOREIGN PATENT DOCUMENTS

JP 2001-67187 3/2001

(Continued)

OTHER PUBLICATIONS

"The Holy Grail of Data Storage Management", Prentice Hall, 2000, J. Toigo.

(Continued)

*Primary Examiner*—Hyung Sough
*Assistant Examiner*—Mardochee Chery
(74) *Attorney, Agent, or Firm*—Mattingly, Stanger, Malur & Brundidge, PC

(57) ABSTRACT

When data written into a volume (source volume) in a parity group in a storage apparatus is written into a volume (destination volume) in a parity group in a storage apparatus using a remote copy function, it is determined during the copy whether or not one or both of the following two specified conditions are satisfied for this set of volumes: (1) the performance of the destination volume after a failover is equal to or higher than the performance of the source volume before the failover; and (2) the performance of the destination volume is equal to or higher than the performance of the source volume during the copy. If the condition(s) is not satisfied, the storage apparatus in which the destination volume is defined is changed in configuration to satisfy the condition.

11 Claims, 23 Drawing Sheets

U.S. PATENT DOCUMENTS

| | | | |
|---|---|---|---|
| 5,155,845 A | | 10/1992 | Beal et al. |
| 5,742,792 A | * | 4/1998 | Yanai et al. ................. 711/162 |
| 5,845,295 A | | 12/1998 | Houseman et al. |
| 5,905,995 A | | 5/1999 | Tabuchi et al. |
| 6,157,963 A | | 12/2000 | Courtright, II et al. |
| 6,334,195 B1 | | 12/2001 | DeKoning et al. |
| 6,405,284 B1 | | 6/2002 | Bridge |
| 6,748,489 B2 | | 6/2004 | Soejima et al. |
| 6,748,510 B1 | | 6/2004 | Coatney |
| 6,775,739 B1 | | 8/2004 | Bachmat et al. |
| 6,810,491 B1 | | 10/2004 | Yamamoto et al. |
| 6,976,103 B1 | * | 12/2005 | Watanabe et al. ............. 710/74 |
| 2002/0103969 A1 | | 8/2002 | Koizumi et al. |
| 2002/0194435 A1 | * | 12/2002 | Yamagami et al. .......... 711/150 |
| 2004/0078644 A1 | | 4/2004 | Fujibayashi et al. |

FOREIGN PATENT DOCUMENTS

| | | |
|---|---|---|
| JP | 2001-175537 | 6/2001 |

OTHER PUBLICATIONS

"Building Storage Networks", Network Professional's Library, Osborne, M. Farley.

"The Resilient Enterprise—Recovering Information Services from Disasters", VERITAS Vision 2002, R. Barker et al.

Blueprints for High Availability, Wiley Computer Publishing, 2002, E. Marcus et al.

* cited by examiner

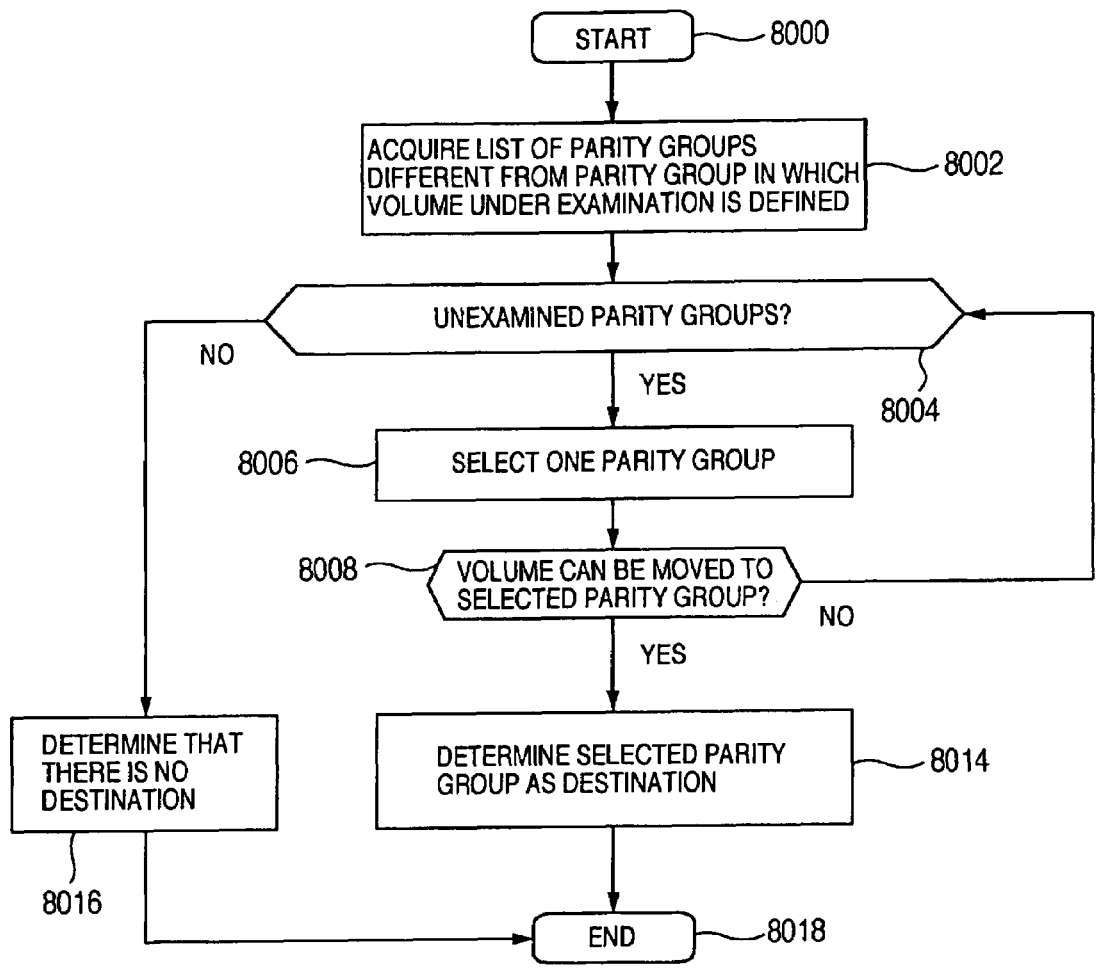

FIG.10

| PARITY GROUP/ VOLUME NAME | TOTAL NUMBER OF REQUESTS (REQUESTS/ SECOND) | AVERAGE REQUEST PROCESSING INTERVAL (SECONDS/ REQUEST) | TOTAL TRANSFER AMOUNT (MB/SECOND) | AVERAGE TRANSFER RATE (MB/SECOND) | |
|---|---|---|---|---|---|
| VOLUME 4012 | 150 | 10 | 50 | 500 | ~10110 |
| VOLUME 4014 | 500 | 10 | 30 | 500 | ~10120 |
| VOLUME 4022 | 800 | 8 | 30 | 600 | ~10130 |
| PARITY GROUP 4010 | 650 | 10 | 80 | 500 | ~10140 |
| PARITY GROUP 4020 | 800 | 8 | 30 | 600 | ~10150 |
| 10000 | 10010 | 10020 | 10030 | 10040 | |

FIG.11

| PARITY GROUP NAME | CAPACITY | VOLUME NAME | |
|---|---|---|---|
| PARITY GROUP 4010 | 64 | VOLUME 4012 | ~11110 |
| | 32 | VOLUME 4014 | ~11120 |
| | 192 | (UNDEFINED) | ~11130 |
| PARITY GROUP 4020 | 64 | VOLUME 4022 | ~11140 |
| | 224 | (UNDEFINED) | ~11150 |
| 11000 | 11010 | 11020 | |

| TOTAL NUMBER OF REQUESTS (REQUESTS/SECOND) | PREDICTED ACCESS TIME (MILLISECONDS) |
|---|---|
| 0 ~ 49 | 20 |
| 50 ~ 199 | 70 |
| 200 ~ 499 | 100 |
| 500 | 200 |

SOURCE VOLUME
  CAPACITY : 7GB  ~22100
  CURRENT PERFORMANCE : 22mscc  ~22110

CANDIDATE PARITY GROUPS FOR
CREATING DESTINATION VOLUME :

|  | FREE CAPACITY | CURRENT PERFORMANCE | PREDICTED PERFORMANCE DURING COPY | PREDICTED PERFORMANCE AFTER FAILOVER |  |
|---|---|---|---|---|---|
| PARITY GROUP 2 | 8GB | 15msec | 17msec | 22msec | 22220 |
| PARITY GROUP 4 | 10GB | 10msec | 14msec | 18msec | 22240 |
| PARITY GROUP 5 | 12GB | 8msec | 11msec | 14msec | 22260 |

22200

22300  22320  22340  22360  22380

METHOD AND APPARATUS FOR ADJUSTING PERFORMANCE OF LOGICAL VOLUME COPY DESTINATION

This is a continuation application of U.S. Ser. No. 10/651,166, filed Aug. 29, 2003 now U.S. Pat. No. 7,047,360.

BACKGROUND OF THE INVENTION

The present invention relates to an adjustment for the performance of a logical volume within a storage apparatus, and more particularly to techniques for use with an inter-logical volume copy function for adjusting the performance of a destination logical volume in accordance with the performance of a source logical volume.

It should be first noted that the "adjustment for the performance of a volume" used herein refers to a modification to the configuration in a storage apparatus in which the volume is defined such that the volume is provided with the performance higher than required performance.

A technique called "RAID" (Redundant Array of Inexpensive Disks) is known for organizing two or more physical disks into a group to provide redundancy and improve the performance and reliability (see, for example, Jon William Toigo, "The Holy Grail of Data Storage Management," Prentice Hall, 2000).

For using a storage apparatus which applies the RAID technique, two or more physical disks (physical storage media) within a storage apparatus are collected to define a logical storage apparatus called a "parity group."

Then, logical storage areas called "logical volumes" (hereinafter simply called the "volumes" in this disclosure) are defined in the parity group, such that a client computer uses one of the volumes for utilizing the storage apparatus. In many storage apparatuses, two or more volumes can be defined in a single parity group.

FIG. 1 illustrates an exemplary definition for volumes.

In FIG. 1, a physical disk 1000, a physical disk 1010, a physical disk 1020, and a physical disk 1030 make up a single parity group 1100 in which a volume 1110 and a volume 1120 are defined.

In this configuration, the volume 1110 and volume 1120 defined in the parity group 1100 share the physical disk 1000, physical disk 1010, physical disk 1020, and physical disk 1030.

Such a configuration, in which different volumes share the same physical disks, is available not only when a used storage apparatus employs the RAID technique but also when two ore more volumes are defined within a single physical disk.

In a storage apparatus which applies several RAID techniques, storage areas called "logical disks" are defined in the parity group, rather than defining the parity group before volumes are defined in the parity group, so that a combination of the logical disks or a fragmental logical disk area can be defined as a volume. In several other storage apparatuses, physical disks are partially or entirely combined to directly define a volume without defining a parity group.

While there are several methods for forming volumes from physical disks as described above, they are all common in that different volumes share the same physical disks (see, for example, Mark Farley, "Building Storage Networks," Network Professional's Library, Osborne).

In the following, an area comprising a combination of one or more of partial or entire physical disks is collectively called the "parity group," and a logical storage area defined on the parity group is called the "volume."

A certain storage apparatus has a function of copying data between volumes without intervention of a CPU in a computer which utilizes the storage apparatus.

Further, some of the aforementioned storage apparatuses have a function of writing the same data into a destination volume if data is written into a source volume in the inter-volume copy, even after all data has been copied between the volumes, until the two volumes are dissolved from their association. In this disclosure of the present specification, they are collectively expressed as "performing an inter-volume copy."

Among functions of performing an inter-volume copy, a copy between volumes in the same storage apparatus is called a "snapshot" (see, for example, U.S. Pat. No. 5,845,295), while a copy between volumes in different storage apparatuses is called a "remote copy" (see, for example, U.S. Pat. No. 5, 155,845).

In another system, while part or entirety of data included in a volume within a storage apparatus is specified, the data is cached in a cache memory within the storage apparatus (see, for example, JP-A-2001-175537).

In a further system, each volume in a storage apparatus is given a processing priority, such that requests from client computers are processed in accordance with the processing priorities (see, for example, U.S. Pat. No. 6,157,963).

In a further system, volumes within a storage apparatus are relocated to optimize the performance of each volume (see, for example, JP-A-2001-67187).

There is an approach for combining two or more computers to operate them as a single system to improve the performance and availability of the overall system. This approach is called "clustering," and a system which employs the clustering is called a "clustering system" (see, for example, Richard Barker, Mark Erickson et al., The Resilient Enterprise—Recovering information services from disasters, VERITAS Vision 2002 distributed book, 2002, and Evans Marcus, Hal Stern, Blueprints for High Availability, Wiley Computer Publishing, 200).

Cluster systems are generally classified into a load balance type and a failover type. The load balance type cluster system distributes service applications among all servers so that the servers process the service applications. The failover type cluster system in turn divides a group of servers into a server for processing service applications (active server), and a server (standby server) which is normally in standby and takes over (fails over) the processing if the active server fails in the operation.

The failover type cluster systems include a system which has an active server and a standby server that share volumes, and a system which has servers that mutually mirror volumes (have copies of the same data).

FIG. 2 illustrates an exemplary configuration of a failover type cluster system which mirrors volumes.

A computer 2000 and a computer 2100 are connected to a communication device 2400 and a communication device 2500, respectively. The communication device 2400 and communication device 2500 in turn are connected to a storage apparatus 2200 and a storage apparatus 2300, respectively. The storage apparatus 2200 and storage apparatus 2300 are interconnected through a communication path 2600. A volume 2210 is defined in the storage apparatus 2200, while a volume 2310 is defined in the storage apparatus 2300.

The computer 2000 processes service applications using the volume 2210, and utilizes a remote copy function to copy the volume 2210 to the volume 2310 through the communication path 2600. In this state, data written into the volume 2210 is automatically written into the volume 2310.

In the system illustrated in FIG. 2, when the computer 2000 fails, the computer 2100 takes over (fails over) the processing of the service applications. In this event, the computer 2100 uses the volume 2210 or volume 2310.

On the other hand, when the storage apparatus 2200 fails, either the computer 2000 or computer 2100 processes the service applications using the volume 2300.

However, generally, when the computer 2000 and storage apparatus 2200 are installed in a site geographically remote from a site in which the computer 2100 and storage apparatus 2300 are installed, the computer 2100 processes the service applications using the storage apparatus 2300 if the computer 2000 or storage apparatus 2200 fails.

Since the cluster system illustrated in FIG. 2, fully duplicates the computers, communication devices, communication paths, and volumes, the overall system can continue the operation even if any one of the devices fails within the system.

FIG. 3 illustrates an example in which another volume is defined on the same parity group as the volume 2310 in the cluster system illustrated in FIG. 2.

A computer 2000 and a computer 2100 are connected to a communication device 2400 and a communication device 2500, respectively. The communication device 2400 and communication device 2500 in turn are connected to a storage apparatus 2200 and a storage apparatus 2300, respectively. A computer 3000 is connected to a communication device 3600 which in turn is connected to a storage apparatus 2300. The storage apparatus 2200 and storage apparatus 2300 are interconnected through a communication path 2600. A parity group 3400 is defined in the storage apparatus 2200, while a parity group 3300 is defined in the storage apparatus 2300. Further, a volume 2210 is defined in the parity group 3400, while a volume 2310 and a volume 3310 are defined in the parity group 3300.

Here, the computer 2000 processes service applications using the volume 2210 which is copied to the volume 2310 using a remote copy function. The computer 2100 is in standby for processing the service applications using the volume 2310 in the event the computer 2000 fails. The computer 3000 in turn processes service applications using the volume 3310.

In the cluster system illustrated in FIG. 3, when a fault causes computer 2000 to fail over so that the computer 2100 takes over the processing using the volume 2310, the performance of the overall system is degraded if the volume 2310 has the a performance lower than the volume 2210. This may occur when a load is charged on the volume 3310 which shares the physical disk with the volume 2310.

To avoid the problem mentioned above, the volume 2310 may be located on a different parity group from the volume 3310 on which a load is charged when the cluster system of FIG. 3 is built. However, it is not always possible to avoid the degradation in the performance of the overall system after the failover due to the influences exerted by an increase and decrease in a load on each volume resulting from a change in the trend of accesses to the storage apparatuses of the service applications executed by the computer 3000 and the service applications executed by the computer, 2000, a modification in configuration for optimizing the performance of each volume by the relocation of the volumes described in the section of prior art, and the like.

SUMMARY OF THE INVENTION

It is a first object of the present invention to provide a failover type cluster system which is provided with a means for maintaining the performance of the overall system after a failover so as not to be lower than the performance of the overall system before the failover.

If the performance of a destination volume is lower than the performance of a source volume during a snapshot or an inter-volume copy using a remote copy function, a memory for temporarily saving data can be excessively consumed by data which is transferred from the source volume to the destination volume, and an extra standby time is required until the data has been completely written into both volumes.

It is a second object of the present invention to provide a means which permits data to be smoothly and efficiently copied between volumes.

To achieve the above objects, according to the present invention, it is determined during a copy whether or not one or both of the following two specified conditions are satisfied by a set of volumes between which the copy is being made using a snapshot or a remote copy function: (1) the performance of the destination volume after a failover is equal to or higher than the performance of the source volume before the failover; and (2) the performance of the destination volume is equal to or higher than the performance of the source volume during the copy. If the condition(s) is not satisfied, the storage apparatus in which the destination volume is defined is modified in configuration to satisfy the condition.

Also, upon selection of a parity group in which the destination volume is defined before a copy is started, when a volume having the same capacity as the source volume can be defined, and this volume is defined, a list of parity group is acquired for enumerating those parity groups which can define a volume that satisfies one or both of the conditions (1), (2).

Further, it is determined upon start of a copy whether or not the defined source volume and destination volume satisfy one or both of the conditions (1), (2). If not, the storage apparatus in which the source volume is defined is modified in configuration, and if the condition(s) is satisfied, the source volume is associated with the destination volume before the copy is started. If the condition(s) is not satisfied, the copy is not started but is aborted as a fault.

Other features of the present invention will become apparent from the following description of the specification and accompanying drawings.

BRIEF DESCRIPTION OF THE DRAWINGS

FIG. 8 is a flow diagram illustrating a procedure for searching a destination to which a volume is moved in the first embodiment;

FIG. 9 shows an equation for calculating a performance value for a volume or a parity group in the first embodiment;

FIG. 10 is a table showing performance information 4042 in the first embodiment;

FIG. 11 is a table showing configuration information 4052 in the first embodiment;

FIG. 22 shows an exemplary screen which displays the result of a search for destination parity groups;

DETAILED DESCRIPTION OF THE EMBODIMENTS

Figure 1:
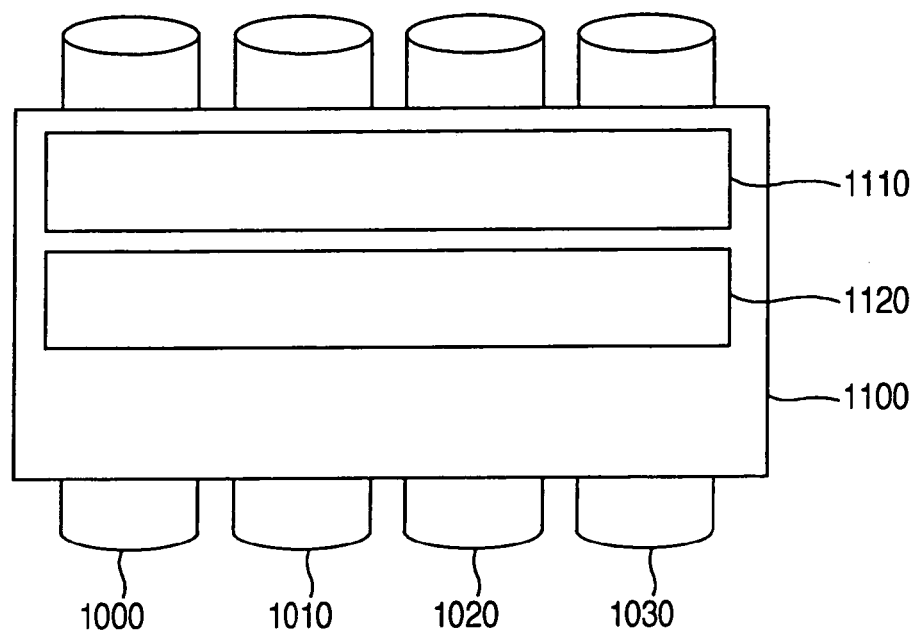
FIG. 1 is a diagram illustrating the relationship between physical disks and logical volumes.
Figure 2:
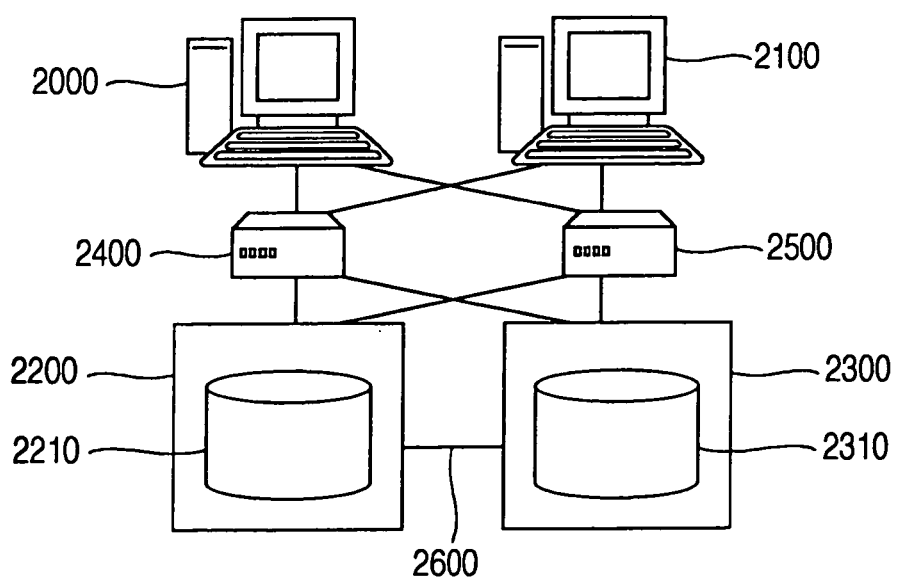
FIG. 2 is a diagram illustrating an exemplary configuration of a cluster system.
Figure 3:
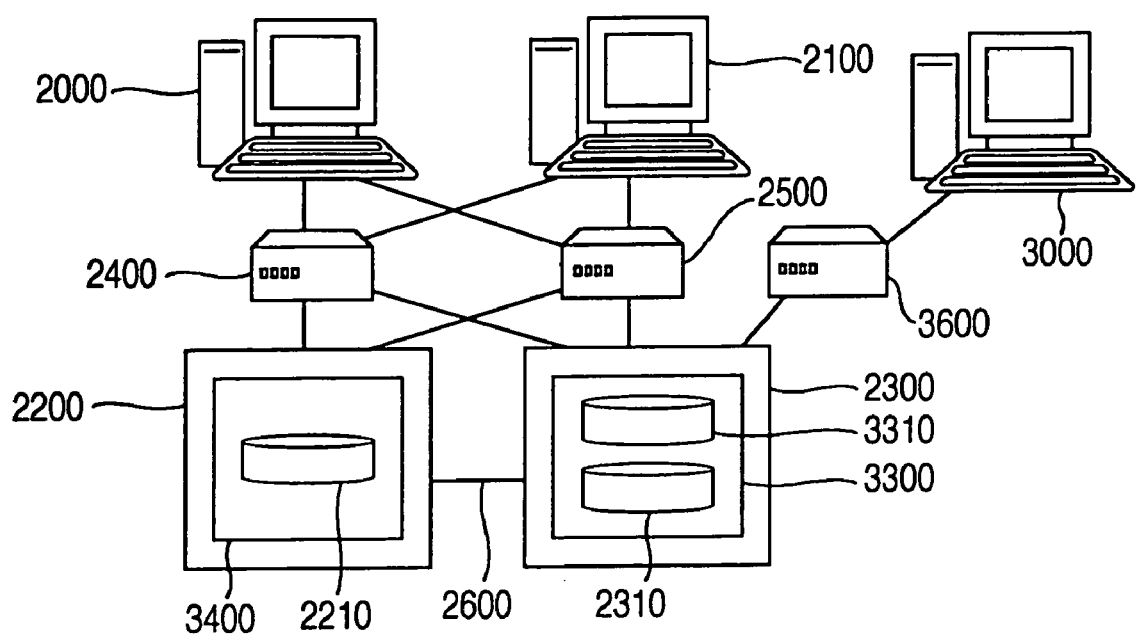
FIG. 3 is a diagram illustrating an exemplary configuration of a failover type cluster system which is susceptible to a degradation in the performance of the overall system after a failover.

FIG. 3 shows a first embodiment in which the present invention is embodied in a storage apparatus 2200 and a storage apparatus 2300.

In the first embodiment, performance information within the storage apparatus 2200 in which a source volume 2210 is defined is transferred to the storage apparatus 2300 through a data communication path 2600 which is provided between the storage apparatus 2200 and storage apparatus 2300 in order to adjust the performance of a destination volume 2310 by moving as required a volume 3310 on the same parity group as the destination volume 2310 to another parity group. The performance adjustment may be triggered when the storage apparatus 2200 is modified in configuration, or may be made at least once every 256 data transfers from the source volume 3310 to the destination volume 2310.

Figure 4:
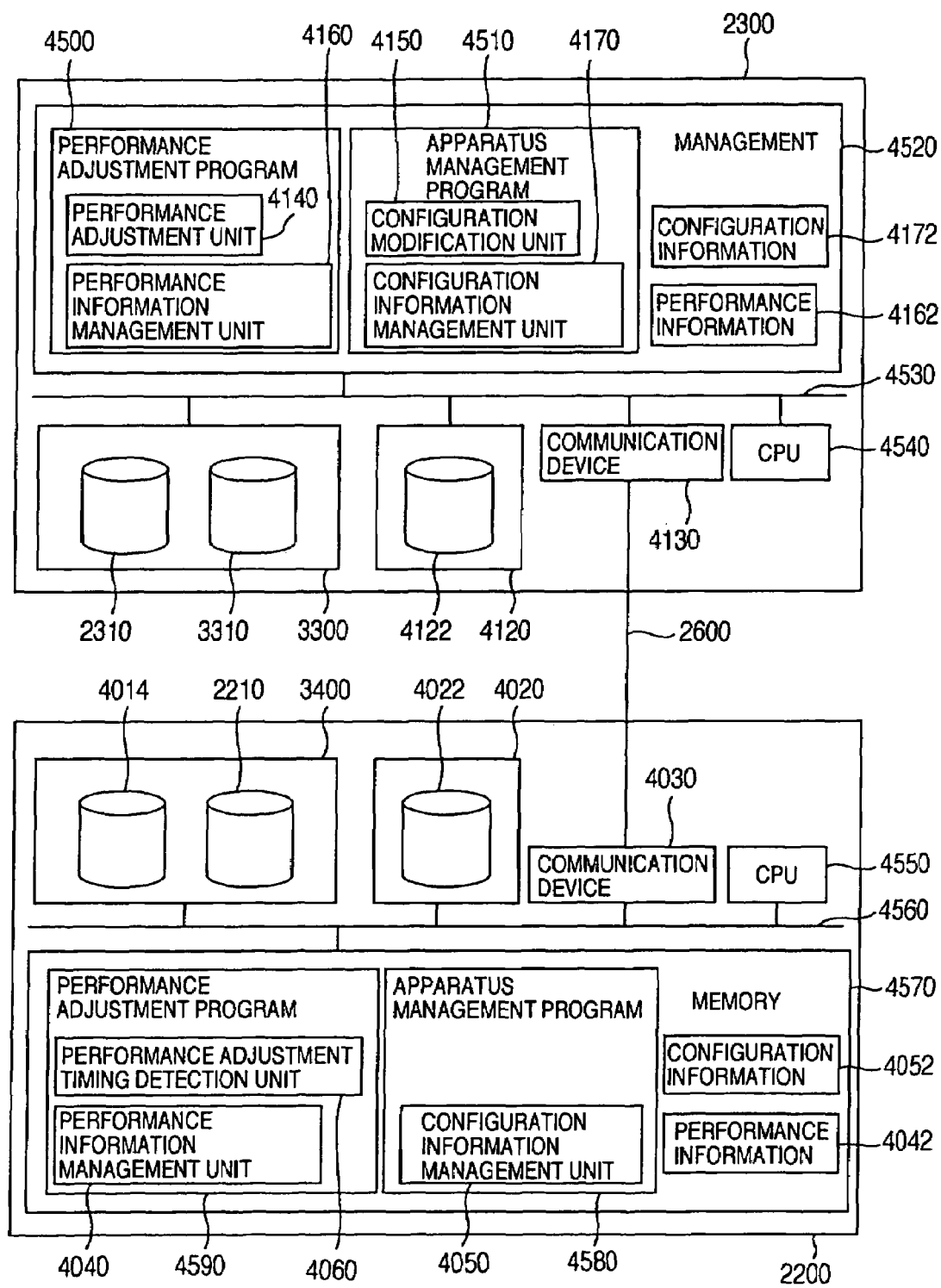
FIG. 4 is a block diagram illustrating the configuration in a storage apparatus 2200 and a storage apparatus 2300 in a first embodiment.

FIG. 4 illustrates in a block diagram form the configuration in the storage apparatus 2200 and storage apparatus 2300 in the first embodiment. A parity group 3400 and a parity group 4020 are defined in the storage apparatus 2200. The volume 2210 and another volume 4014 are defined in the parity group 3400, while a volume 4022 is defined in the parity group 4020. A memory 4570 in the storage apparatus 2200 comprises a performance information management unit 4040 for managing information on the performance of each of parity groups and volumes within the storage apparatus 2200, and stores performance information 4042 managed by the performance information management unit 4040. The "management of performance information," as used in the present specification, includes collection, storage and provision of performance information.

Storage apparatus 2200 comprises a communication device 4030 for transferring data and some or all of the performance information 4042 to another storage apparatus. The memory 4570 stores configuration information 4052 for managing the configuration and relationship of each of volumes and parity groups within the storage apparatus 2200, and comprises a configuration information management unit 4050 for managing the configuration information 4052. The memory 4570 further comprises a performance adjustment timing detection unit 4060 for monitoring the configuration information 4052 managed by the configuration information management unit 4050 to transfer a configuration modification notice to the communication device 4030 in response to a modification in the configuration information 4052. The performance information management unit 4040 and performance adjustment timing detection unit 4060 are included in a performance adjustment program, while the configuration information management unit 4050 is included in an apparatus management program. The storage apparatus 2200 also comprises a bus 4560 and a CPU 4550.

On the other hand, a parity group 3300 and a parity group 4120 are defined in the storage apparatus 2300. A volume 2310 and a volume 3310 are defined in the parity group 3300, while a volume 4122 is defined in the parity group 4120. The storage device 2300 comprises a memory 4520 which stores performance information 4162 associated with each of parity groups and volumes in the storage apparatus 2300, and comprises a performance information management unit 4160 for managing the performance information 4162. The storage apparatus 2300 also comprises a communication device 4130 for receiving data and some or all of the performance information 4042 from the communication device 4030 through the communication path 2600. The memory 4520 also stores configuration information 4172 related to the volumes and parity groups in the storage apparatus 2300, and comprises a configuration information management unit 4170 for managing the configuration information 4172.

The memory 4520 also comprises a performance adjustment unit 4140 for acquiring the performance information on each of the parity groups and volumes in the storage apparatus 2200 and storage apparatus 2300 from the communication device 4130 and performance information management unit 4160 to determine whether or not the performance of a destination volume should be adjusted, and adjust the performance of the destination volume if necessary; and a configuration modification unit 4150 for changing the configuration information 4172 in the storage apparatus 2300 in response to a request from the performance adjustment unit 4140. The performance adjustment unit 4140 and performance information management unit 4160 are included in the performance adjustment program, while the configuration modification unit 4150 and configuration information management unit 4170 are included in the apparatus management program. The storage apparatus 2300 also comprises a bus 4530 and a CPU 4540.

In the first embodiment, the two volumes 2210, 2310 are associated with each other by a remote copy function such that data is copied from the volume 2210 to the volume 2310. When the performance of the volume 2310, after the dissolution of the association between the volumes in which the remote copy is performed, is anticipated to be lower than the performance of the volume 2210 which is maintained while the copying relationship is established between the volumes, it is determined that an adjustment is required for the performance of the volume 2310 on the assumption that the performance of the overall system will be degraded after a failover.

When it is determined that the performance adjustment is required, the volume 3310, which shares the parity group with the volume 2310, is moved to the other parity group, i.e., the parity group 4120 in the storage apparatus 2300.

In the first embodiment, assume that the performance information management unit 4040 and performance information management unit 4160 always collect every minute of performance information on all volumes in the storage apparatuses which are provided with the respective performance information management units. However, the time interval at which the performance information is collected is not limited to one minute but may be any other time. In addition, the performance information need not be collected at all times, but the performance information for one minute may be collected every hour.

The configuration modification notice issued by the performance adjustment timing detection unit 4060 is a signal which indicates that the configuration information 4052 is modified in the storage apparatus 2200.

As described in the section of the prior art, the configuration information 4052 may be modified in response to a relocation of volumes by the performance optimization function, the use of a function of making data included in a volume resident in the cache memory of the storage apparatus, the generation of a new volume or parity group in the storage apparatus 2200, a deletion of an existing volume or parity group, and the like.

Figure 5:
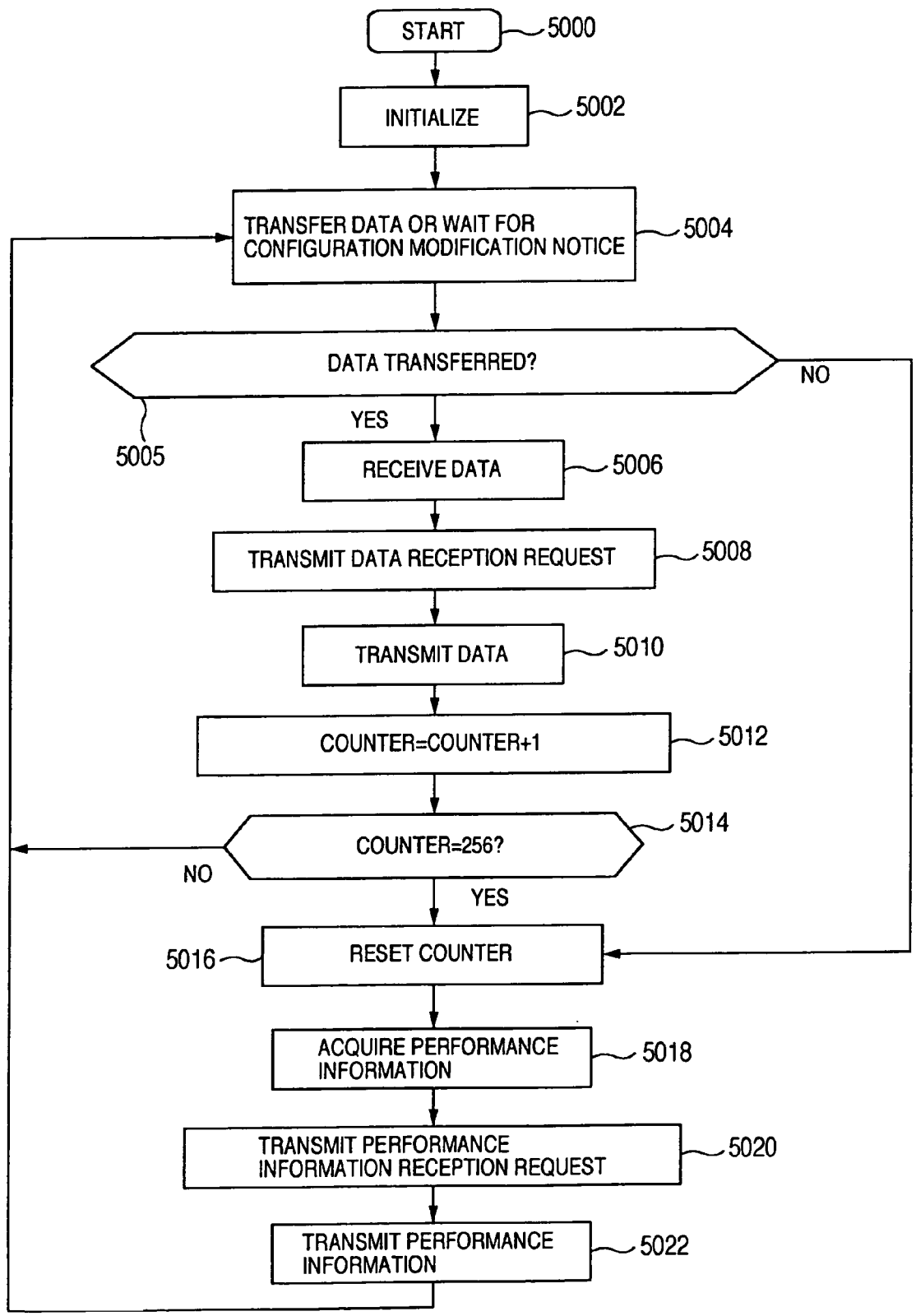
FIG. 5 is a flow diagram illustrating a procedure for transmitting data and performance information from a communication device 4030 in the first embodiment.

FIG. 5 illustrates the flow of the processing performed by the communication device 4030 in FIG. 4.

After the start (at step 5000), the communication device 4030 initializes internal data, such as initializing a counter for determining an opportunity of sending the performance information to the communication device 4130 to zero, at step 5002. Next, at step 5004, the communication device 4030 waits for data which should be copied from the volume 2210 to the volume 2310 or for a configuration modification notice issued by the performance adjustment timing detection unit 4060. When data which should be copied is generated while waiting at step 5004, the communication device 4030 receives the data at step 5006. Subsequently, at step 5008, the communication device 4030 sends a data reception request to the communication device 4130, before it transmits the data acquired at step 5006 to the communication device 4130 at step 5010. The communication device 4030 next increments the counter by one at step 5012, and when the counter reaches 256 at step 5014 as a result of the increment at step 5012, the communication device 4030 continuously executes step 5016. On the other hand, if the counter does not reach 256 at step 5014, the communication device 4030 returns to step 5004 to continue the processing.

When the counter reaches 256 at step 5014, or when there is no data to be copied at step 5005, the communication device 4030 initializes the counter to zero at step 5016, acquires some or all of the performance information 4042 from the performance information management unit 4040 at step 5018, sends a performance information reception request to the communication device 4130 at step 5020, and subsequently sends the performance information acquired at step 5018 to the communication device 4130 at step 5022. The performance information acquired at step 5018 will be described later.

Figure 6:
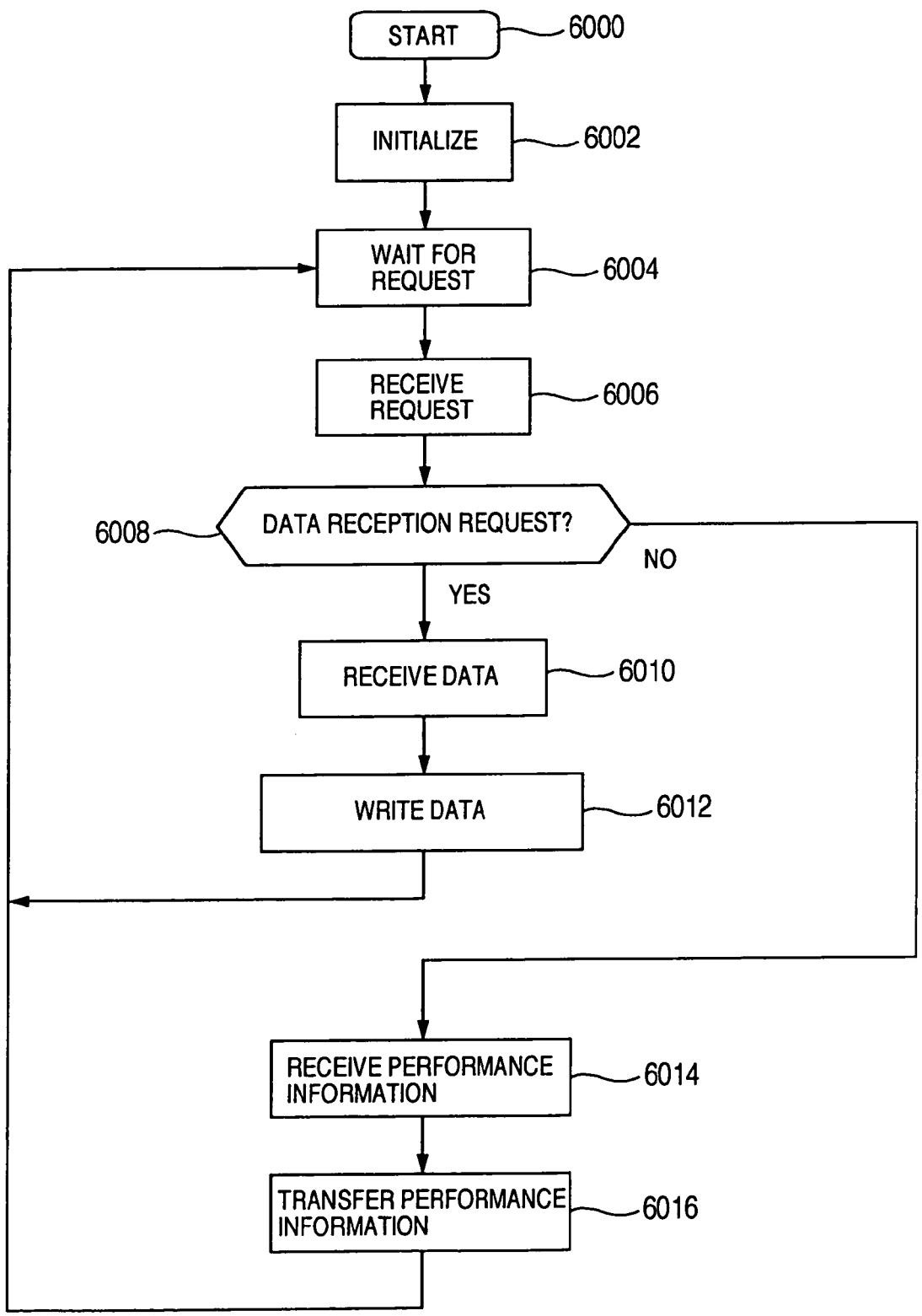
FIG. 6 is a flow diagram illustrating a procedure for receiving data and performance information at a communication device 4130 in the first embodiment.

FIG. 6 illustrates the flow of the processing performed by the communication device 4130 in FIG. 4.

Upon start of the processing (at step 6000), the communication device 4130 initializes internal data at step 6002, and waits for a data reception request or a performance information reception request which is to be sent from the communication device 4030 in FIG. 4 at step 6004.

As either of the requests reaches, the communication device 4130 receives the request at step 6006. Then, at step 6008, the communication device 4130 determines whether or not the received request is a data reception request. When the received request is a data reception request, the communication device 4130 receives data sequentially sent from the communication device 4030 at step 6010. Then, at step 6012, the communication device 4130 writes the received data into the volume 2310 which is the destination of the data.

If the communication device 4130 determines at step 6008 that the received request is not a data reception request, the communication device 4130 regards data next sent thereto from the communication device 4030 as performance information, and receives the performance information at step 6014. Then, at step 6016, the communication device 4130 transfers the performance information received at step 6014 to the performance adjustment unit 4140. At the end of the processing at step 6012 or step 6016, the communication device 4130 again returns to step 6004 to continue the processing.

Figure 7:
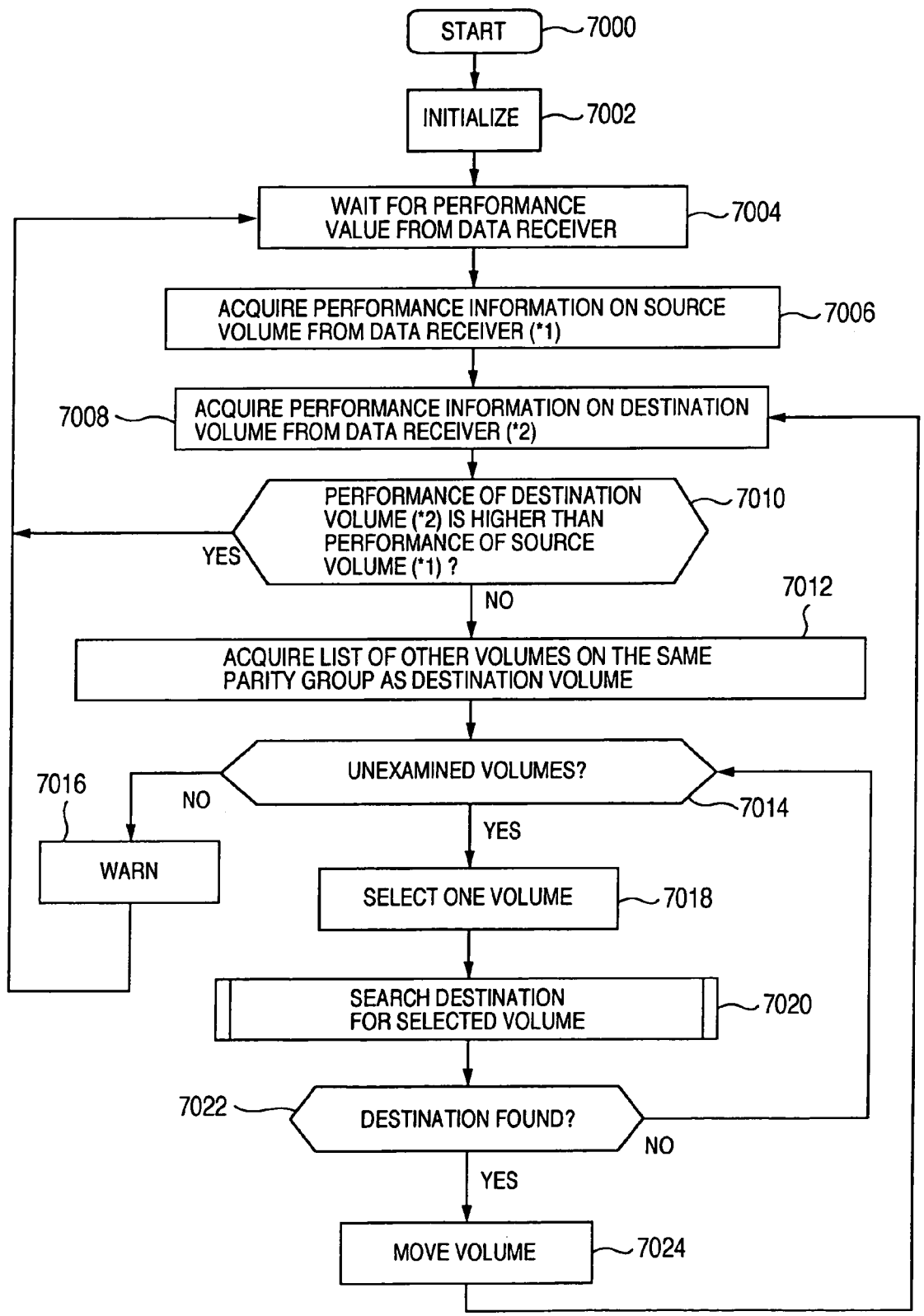
FIG. 7 is a flow diagram illustrating a procedure performed by a performance adjusting unit 4140 for adjusting the performance of a remote copy destination volume in the first embodiment.

FIG. 7 illustrates the flow of the processing performed by the performance adjustment unit 4140 in FIG. 4.

After the start of the processing (at step 7000), the performance adjustment unit 4140 initializes internal data at step 7002. Then, the performance adjustment unit 4140 waits for a data which is transferred from the communication device 4130 (at step 6016) at step 7004. As the data is transferred, the performance adjustment unit 4140 receives the data at step 7006, and subsequently acquires some or all of the performance information 4162 from the performance information management unit 4160 at step 7008. Next, at step 7010, the performance adjustment unit 4140 compares the performance information acquired at step 7008 with the performance information acquired at step 7006, supposes at this time that a failover occurs, and determines whether or not the performance of the volume 2310 (destination volume) after the failover is equal to or higher than the performance of the volume 2210 (source volume) before the failover. The performance information acquired at step 7008 and the comparison of the performance information at step 7010 will be described later.

If the performance adjustment unit 4140 determines at step 7010 that the performance of the destination volume 2310 after the failover is equal to or higher than the performance of the source volume 2210 before the failover, the performance adjustment unit 4140 returns to step 7004 to continues the processing. Otherwise, the performance adjustment unit 4140 continues the processing from step 7012. At step 7012, the performance adjustment unit 4140 acquires a list of volumes defined on the same parity group as the destination volume from the configuration information management unit 4170. In the first embodiment, the appropriate volume is the volume 3310 which is defined on the same parity group 3300 as the volume 2310.

After step 7012, the performance adjustment unit 4140 determines at step 7014 whether or not the volume list still includes volumes which have not been processed at step 7018. If there is no volume which has not been processed at step 7018 after step 7012, the performance adjustment unit 4140 sends an electronic mail to a system manager at step 7016 for warning on the assumption that the performance of the destination volume after the failover cannot be improved to or beyond the performance of the source volume before the failover even if a largest possible number of volumes defined on the same parity group as the destination volume are moved to another parity group. The warning is not limited to the electronic mail, but may be in the form of a message which is displayed on a management screen, or may be produced as sound.

At step 7014, if there is a volume which has not been processed at step 7018 after step 7012, the performance adjustment unit 4140 selects at step 7018 one of volumes which have not been processed at step 7018 after step 7012. Then, at step 7020, the performance adjustment unit 4140 searches for parity groups to which the selected volume can be moved. When determining at step 7022 that a parity group is found for moving the selected volume thereto as a result of the search, the performance adjustment unit 4140 uses the configuration modification unit 4150 to move the selected volume to the destination parity group found by the search at step 7024, and returns to step 7008 to continue the processing.

FIG. 8 illustrates the flow of the processing at step 7020.

Upon start of the processing (at step 8000), the performance adjustment unit 4140 acquires a list of parity groups different from the parity group in which the specified volume under examination is defined at step 8002. Subsequently, if there is no parity group which has not been processed at step 8006 in the acquired list of parity groups at step 8004, the processing is terminated (at step 8018) on the assumption that no destination has been found for the specified volume at step 8016. Conversely, if there are parity groups which have not been processed at step 8006, as determined at step 8004, the performance adjustment unit 4140 selects at step 8006 one of those parity groups which have not been processed at step 8006. Then, the performance adjustment unit 4140 checks at step 8008 whether or not the selected parity group has a free space wide enough to move the volume under examination thereto. If there is no enough free space, the performance adjustment unit 4140 returns to step 8004 to continue the processing on the assumption that the movement is impossible.

The determination at step 8008 as to whether or not the volume under examination can be moved to the parity group may be made with reference to whether or not the parity group which includes the volume under examination and the selected parity group match in an arbitrary attribute (for example, the number of physical disks which make up the parity group, how the redundancy is provided), or whether or not the volume subjected to the movement has an attribute set at a particular value (for example, whether or not the volume subjected to the movement is assigned as a remote copy destination), not limited to the presence or absence of a free region.

When the performance adjustment unit 4140 determines at step 8008 that the volume under examination can be moved to the selected parity group, the performance adjustment unit 4140 determines the selected parity group as the destination of the volume under examination (the result of the processing) at step 8014, followed by termination of the processing (step 8018).

FIG. 9 shows an equation for evaluating the performance of a volume or a parity group in the first embodiment. A term 9000 represents the total number of access requests per unit time to a volume or a parity group subjected to the evaluation. A term 9010 represents an average request processing interval which indicates an average time required from the completion of the processing of a certain access request to the start of the processing of the next access request when access requests are made in sequence to the volume or parity group subjected to the evaluation. A term 9020 represents the total amount of data transferred from the volume or parity group subjected to evaluation per unit time. A term 9030 represents an average amount of data which can be read from or written into the volume or parity group subjected to the examination per unit time, and which is a value on specifications. The value evaluated by the equation shown in FIG. 9 indicates the proportion of time in which a transfer function (data transfer, preparation therefor, and post-processing) is used per unit time, and it can be said that as this value is larger, an associated volume is more heavily loaded.

FIG. 10 shows an example of the performance information 4042.

As mentioned above, FIG. 10 shows information on the performance of volumes and party groups in the storage apparatus 2200. A row 10100 shows labels indicative of the contents of respective columns, and may not be included in the table. Rows 10110, 10120, 10130 show information on the performance of the respective volumes, and rows 10140, 10150 show information on the performance of the respective parity groups. Each row comprises one entry.

A column 10000 shows a volume name or a parity group name of the entry. A column 10010 shows the total number of access requests per unit time to a volume or a parity group indicated by the entry, which is the value used in the term 9000 in the equation of FIG. 9. A column 10020 shows an average required processing interval in the volume or parity group indicated by the entry. The average required processing interval refers to an average time required from the completion of the processing on a certain request to the start of the processing on the next request when access requests are made in sequence. The value in the column 10020 is used in the term 9020 in the equation of FIG. 9. A column 10030 shows a total transfer amount per unit time to the volume or parity group indicated by the entry. The total transfer amount, used herein, refers to the total amount of read data and written data. The value in the column 10030 is used in the term 9020 in the equation of FIG. 9. A column 10040 shows an average transfer rate in the volume or parity group indicated by the entry. The average transfer rate is the value on specifications in an associated device in the first embodiment. Alternatively, the average transfer rate may be an average value calculated from past logs. The value indicated in the column 10040 is used in the term 9030 in the equation of FIG. 9. While FIG. 10 shows an example of the performance information 4042, a table of the same type is used for the performance information 4162 as well.

FIG. 11 shows an example of the configuration information 4052.

The table of FIG. 11 shows parity groups defined in the storage apparatus 2200, as well as the capacities and names of volumes defined in the parity groups and undefined regions.

A column 11000 shows the names of the parity groups, and a column 11020 shows the names of volumes defined in the parity groups, or free spaces. A row with "(undefined)" written in the column 11020 shows a free capacity of the parity group shown in the column 11000 corresponding to the row, and the remaining rows show the names of the volumes. A column 11010 shows the capacity of the volume or free region specified by the column 11020.

A row 11100 shows the contents of the item shown in each column, and may not be included in the table. Rows 11110, 11120 show the volumes defined in the parity group 3400 indicated in the column 11000, respectively, and the row 11130 shows a free capacity of the parity group 3400. Similarly, rows 11140, 11150 show the volumes defined in the parity group 4020 indicated in the column 11000, as well as a free region and a capacity. While FIG. 11 shows an example of the configuration information 4052, a table of the same type is used for the configuration information 4172 as well.

The performance information in the first embodiment refers to the result of calculating the equation for evaluating the performance of a volume or a parity group, as fully described in connection with FIG. 9 (hereinafter called the "performance value").

The performance information on the source volume 2210 of a remote copy, acquired by the communication device 4030 from the performance information management unit 4040 at step 5018, refers to the performance value for a volume other than the source volume, i.e., the volume 4014 out of those volumes defined on the parity group 3400 to which the source volume belongs (when there are a plurality of the volumes, the sum of their performance values is calculated. In the following, this sum is called the "first performance value" in the first embodiment). Since the source volume is less burdened with loads of other volumes as the sum of performance values is smaller, the source volume has higher performance.

The performance information on a destination volume of a remote copy, acquired by the performance adjustment unit 4140 from the performance information management unit 4160 at step 7008, refers to the performance value for a volume other than the destination volume, i.e., the volume 3310 out of those volumes defined on the parity group 3300 to which the destination volume 2310 belongs (when there are a plurality of the volumes, the sum of their performance values is calculated. In the following, this sum is called the "second performance value" in the first embodiment).

When the performance adjustment unit 4140 determines at step 7010 whether or not the performance of the destination volume after a failover is equal to or higher than the performance of the source volume before the failover, the performance adjustment unit 4140 determines whether or not the second performance value is smaller than the first performance value.

In the flow of the processing performed by the performance adjustment unit 4140 in the first embodiment, i.e., the flow of the processing illustrated in FIG. 7, the second performance value is acquired every time from the performance information management unit 4160 at step 7008. Alternatively, at the first execution of step 7008, the performance adjustment unit 4140 may acquire the performance values of the respective volumes, rather than the second performance value, and add the performance values of the respective volumes to calculate the second performance value. Then, the performance adjustment unit 4140 may subtract the performance value of the volume which is moved at step 7024 from the second performance value, thereby eliminating a query on the second performance value to the performance information management unit 4160 when step 7008 is executed from the second time onward.

In the flow of the processing performed by the performance adjustment unit 4140 in the first embodiment, i.e., the flow of processing illustrated in FIG. 7, when volumes on the same parity group as the destination volume can be moved to another parity group, one volume is moved before the performance adjustment unit 4140 again compares the performance values at step 7010 to determine whether or not another volume should be moved. Alternatively, before one volume is moved at step 7024, the performance adjustment unit 4140 may fully examine which volume should be moved to result in true in the condition at step 7010 and then collectively move appropriate volumes. In this event, if the performance adjustment unit 4140 does not find any volume which causes the condition at step 7010 to be true, no volume may be moved.

In regard to the movement of volumes, after acquiring a volume list at step 7012, the performance adjustment unit 4140 may rearrange volumes in an order in which they have heavier loads, and execute step 7014 in order from the volume having the heaviest load in the rearranged volumes, thereby reducing the number of volumes which should be moved.

At step 8008 in the flow of processing illustrated in FIG. 8, when a volume under examination is another snapshot or a source volume or a destination volume of a remote copy, the performance adjustment unit 4140 may determine that the volume cannot be moved.

Likewise, in the flow of processing illustrated in FIG. 7, when the performance adjustment unit 4140 acquires a volume list at step 7012, those volumes which are a source volume or a destination volume of a snapshot or a remote copy, and a volume which has a particular attribute (for example, a volume which has a valid cache resident function) may not be included in the volume list, or may be placed at the top or bottom of the list.

In the first embodiment, the performance adjustment timing detection unit 4060 transmits a configuration modification notice to the communication device 4030 each time the configuration information 4052 is modified. Alternatively, the configuration modification notice may be transmitted only in response to a change in the definition of a previously specified volume, or a volume on a parity group on which defined is a volume which is copying data with another volume using the remote copy function.

Next, in a second embodiment of the present invention described below, an inter-volume copy is performed between volumes defined in the same storage apparatus using a snapshot function in a computer system, wherein a check is made every hour as to whether the performance of a destination volume after a failover can be degraded below the performance of a source volume before the failover, and volumes defined on the same parity group as the destination volume are moved to another parity group if such degradation is probably.

Figure 12:
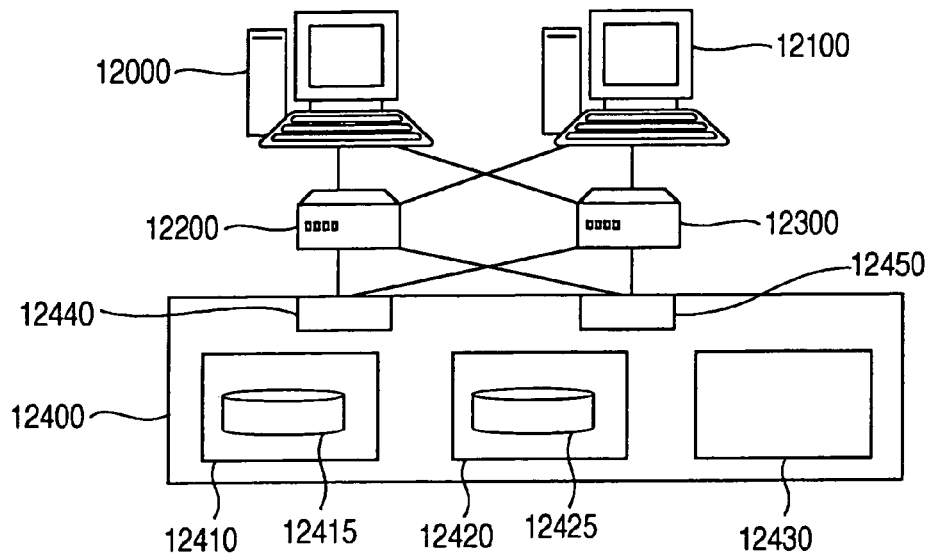
FIG. 12 is a diagram illustrating the configuration of a system in a second embodiment.

FIG. 12 illustrates the configuration of a system in the second embodiment.

A computer 12000 and a computer 12100 are connected to a communication device 12200 and a communication device 12300, respectively, and the communication device 12200 and communication device 12300 are connected to a communication unit 12440 and a communication unit 12450 in a storage apparatus 12400, respectively. A parity group 12410, a parity group 12420, and a parity group 12430 are defined in the storage apparatus 12400, and a volume 12415 is defined in the parity group 12410, while a parity group 12425 is defined in the parity group 12420.

Figure 13:
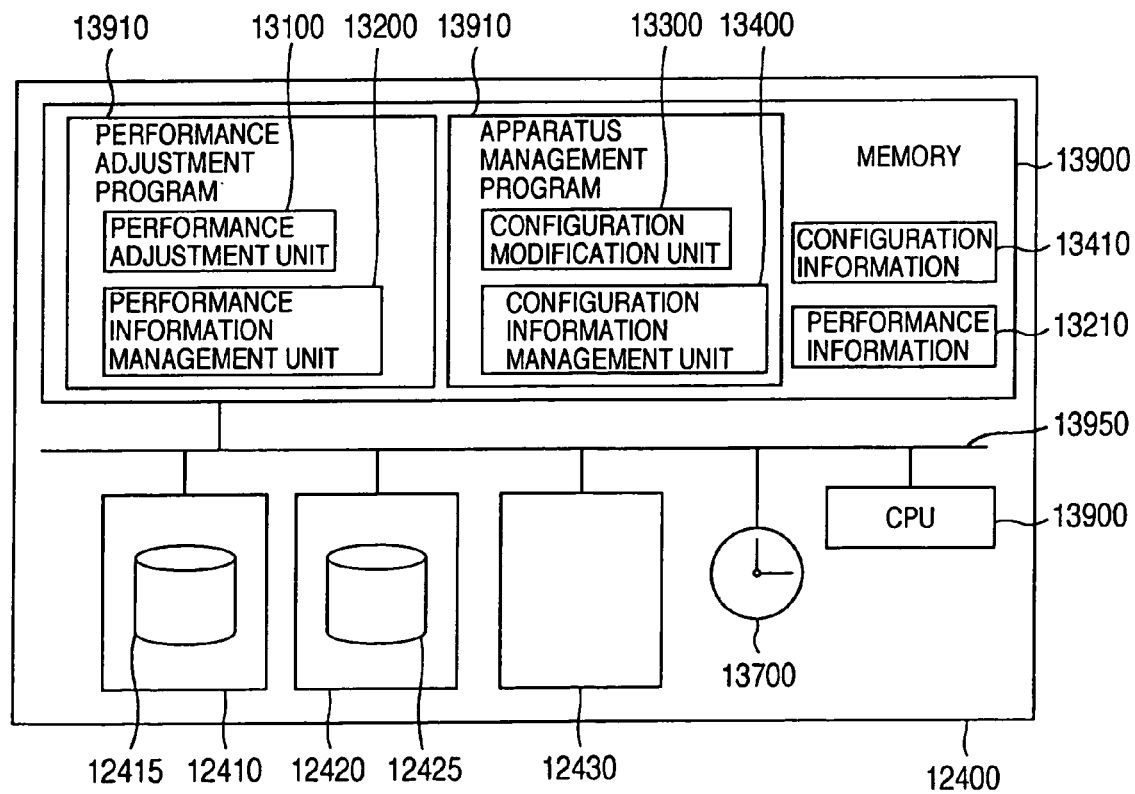
FIG. 13 is a block diagram illustrating the configuration in a storage apparatus 12400 in the second embodiment.

FIG. 13 illustrates in a block diagram form the configuration in the storage apparatus 12400 in the second embodiment.

The parity group 12410, parity group 12420, and parity group 12430 are defined in the storage apparatus 12400, and the volume 12415 is defined in the parity group 12410, while the volume 12425 is defined in the parity group 12420.

A memory 13900 stores performance information 13200 related to the parity group 12410, parity group 12420, and parity group 12430 as well as the volumes defined therein, and comprises a performance information management unit 13210 for managing the performance information 13210.

The memory 13900 further comprises a configuration modification unit 13300 which has a function of controlling a movement of a volume between parity groups in the storage apparatus 12400, a change in cache capacities assigned to respective volumes, and processing priorities given to the volumes and parity groups. The storage apparatus 12400 further comprises a timer 13700 which can notify the performance adjustment unit of the arrival of time each time a specified time elapses. The memory 13900 further stores a configuration information 13410 related to the volumes and parity groups in the storage apparatus 12400, and comprises a configuration information management unit 13400 for managing the configuration information 13410. Also, the memory 13900 comprises a performance adjustment unit 13100 for changing the configuration information 13410 such that the performance of a destination volume is equal to or higher than the performance of a source volume for all volumes in the storage apparatus 12400 which are using a snapshot function, with the aid of the performance information management unit 13200, configuration modification unit 13300, configuration information management unit 13400, and timer 13700.

The performance adjustment unit 13100 and performance information management unit 13200 are included in a performance adjustment program, while the configuration modification unit 13300 and configuration information management unit 13400 are included in an apparatus management program. The storage apparatus 12400 also comprises a bus 13950 and a CPU 13900. A table of the same type as that shown in FIG. 10 is used for the performance information 13210. Likewise, a table of the same type as that shown in FIG. 11 is used for the configuration information 13410.

Figure 14:
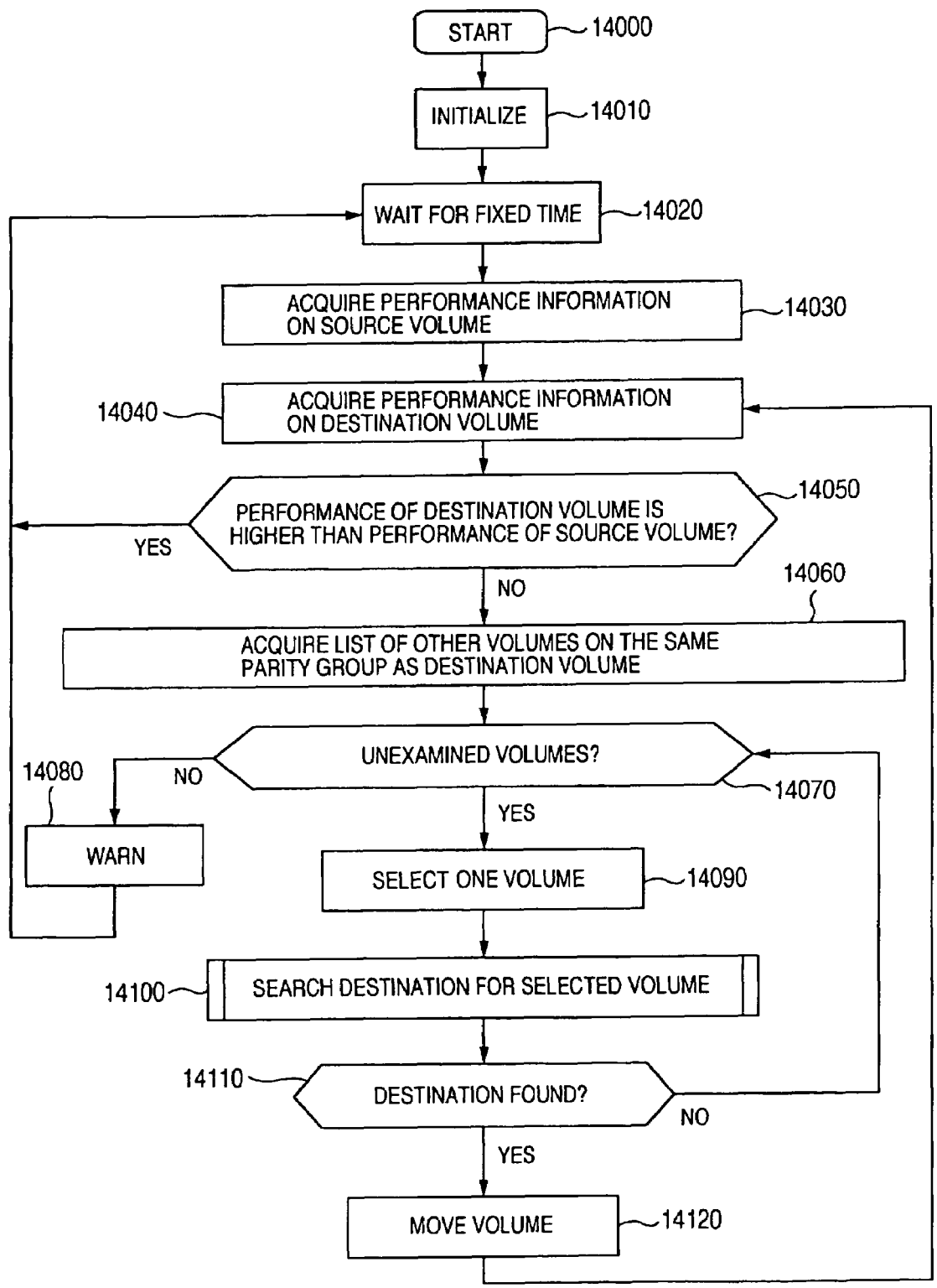
FIG. 14 is a flow diagram illustrating a procedure executed by a performance adjusting unit 13100 for adjusting the performance of a snapshot destination volume in the second embodiment.

FIG. 14 illustrates the flow of the processing performed by the performance adjustment unit 13100 in FIG. 13.

After starting the processing (at step 14000), the performance adjustment unit 13100 initializes internal data and timer 13700 at step 14010. Next, at step 1420, the performance adjustment unit 13100 waits for one hour with reference to the timer 13700. After step 14020 has been executed, the performance adjustment unit 13100 acquires performance information which is the sum of respective performance values (hereinafter called the "first performance value" in the second embodiment) for volumes, except for a source volume, on the same parity group as the source volume from the performance information management unit 13200 at step 14030. In the second embodiment, the performance value refers to the value resulting from the evaluation of a volume under examination calculated by the equation of FIG. 9.

Similarly, at step 14040, the performance adjustment unit 13100 acquires performance information which is the sum of performance values (hereinafter called the "second performance value" in the second embodiment) for volumes, except for a destination volume, on the same parity group as the destination volume from the performance information management unit 13200.

Next, the performance adjustment unit 13100 determines at step 14050 whether or not the performance of the destination volume after a failover is equivalent to the performance of the source volume before the failover. Actually, the performance adjustment unit 13100 determines whether or not the second performance value is equal to or larger than the first performance value. If the second performance value is equal to or larger than the first performance value at step 14050, the performance adjustment unit 13100 returns to step 14020 to continue the processing.

On the other hand, if the second performance value is smaller than the first performance value, the performance adjustment unit 13100 acquires a list of volumes which are defined on the same parity group as the destination volume at step 14060. Then, the performance adjustment unit 13100 determines at step 14070 whether or not there are volumes which have not been processed at step 14090 after executing step 14060 in the list of parity groups. If there is no such volume, the performance adjustment unit 13100 warns the manager at step 14080, and then returns to step 14020 to continue the processing. Here, the processing at step 14080 is similar to that at step 7016 (see FIG. 7).

On the other hand, if there are volumes which have not been processed at step 14090 after executing step 14060, as determined at step 14070, the performance adjustment unit 13100 selects one of such volumes at step 14090. Then, at step 14100, the performance adjustment unit 13100 searches for a destination to which the volume selected at step 14090 can be moved. The processing at step 14090 is similar to that at step 7020. Then, if the result of step 14100 is empty at step 14110, the performance adjustment unit 13100 returns to step 14070 to continue the processing. If the performance adjustment unit 13100 determines at step 14110 that the result of step 14100 is not empty, the performance adjustment unit 13100 moves the selected volume to a parity group resulting from the search with the aid of the configuration modification unit 13300, and returns to step 14040 to continue the processing.

When the destination is searched for the volume selected at step 14100, a parity group in which the source volume of a snapshot is defined is excluded from parity groups which are searched for use as the destination.

The time for which the performance adjustment unit 13100 waits at step 1420 need not be a fixed time, but the waiting time may be increased or decreased depending on whether or not step 14060 or 14120 is executed.

Next, in a third embodiment of the present invention described below, a storage apparatus has a function of acquiring a list of parity groups upon specifying a source volume for creating a copy of a volume using the snapshot function, where the list enumerates parity groups in which destination volumes defined therein can provide higher performance during the copy than the source volume (hereinafter called the "first condition" in the third embodiment).

The system configuration in the third embodiment is similar to that illustrated in FIG. 3.

Figure 15:
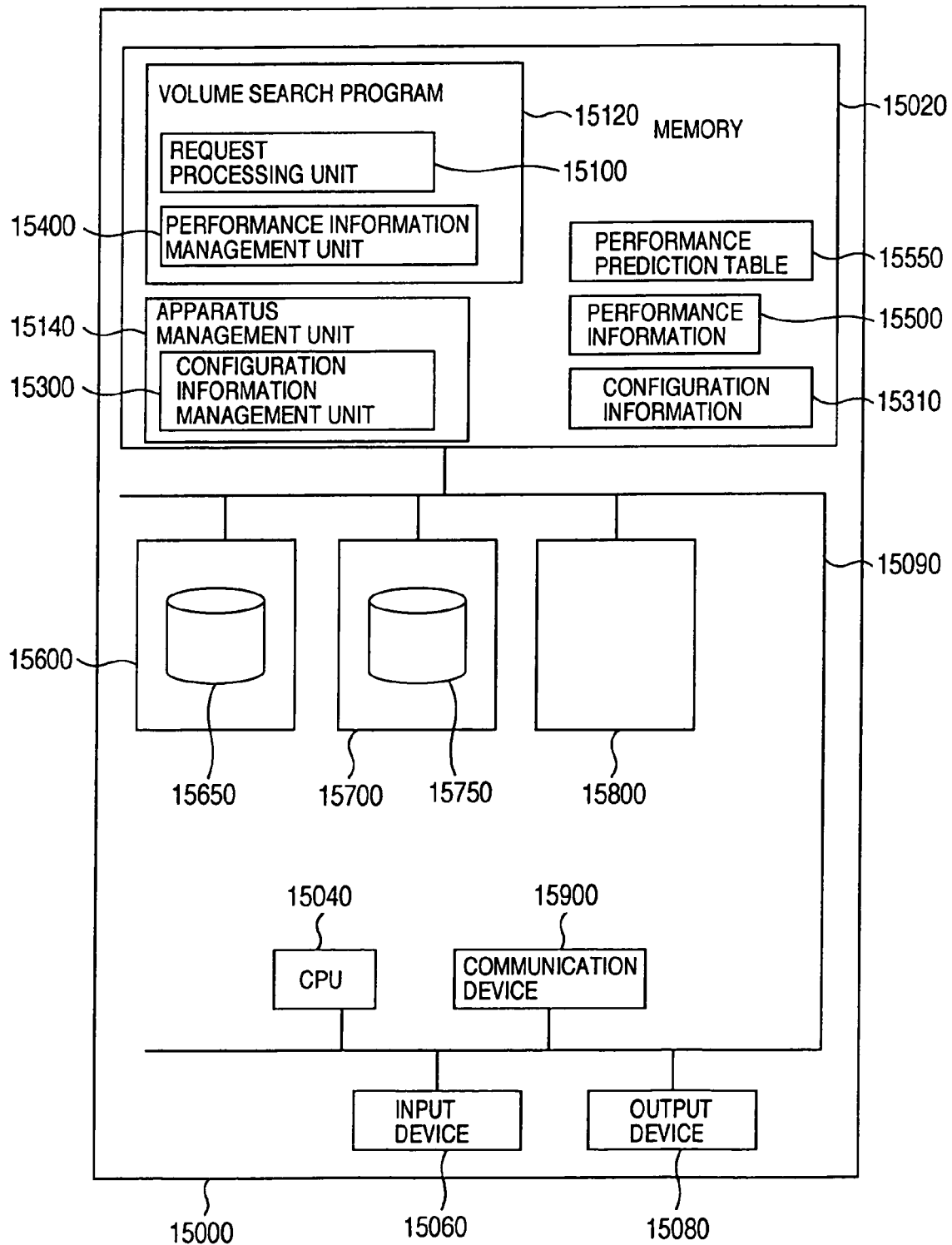
FIG. 15 is a block diagram illustrating the configuration in a storage apparatus in a third embodiment.

FIG. 15 illustrates in a block diagram form the configuration in the storage apparatus in the third embodiment. A parity group 15600, a parity group 15700, and a parity group 15800 are defined in the storage apparatus 15000, and a volume 15650 is defined in the parity group 15600, while a volume 15750 is defined in the parity group 15700.

A memory 15020 in the storage apparatus 15000 stores configuration information 15310 related to the volumes and parity groups in the storage apparatus 15000, performance information 15500 associated with the performance information on the volumes and parity groups in the storage apparatus 15000, and a performance prediction table 15550 for predicting the performance based on the performance information 15500. The memory 15020 further comprises configuration information management unit 15300 for managing the configuration information 15310, and a performance information management unit 15400 for managing the performance information 15500 to predict the performance using the performance prediction table 15550. Here, the performance information 15500 stores the total number of requests per unit time for each of the volumes and parity groups.

The storage apparatus 15000 further comprises a communication device 15900 for receiving, from a computer which uses the storage apparatus 15000, a list of parity groups which satisfy the aforementioned first condition, and for returning the processing result for the request, and the memory 15020 comprises a request processing unit 15100 for processing the request.

The request processing unit 15100 and performance information management unit 15400 are included in a volume search program 15120, while the configuration information management unit 15300 is included in an apparatus management program 15140. The storage apparatus 15000 also comprises a CPU 15040, an input device 15060, an output device 15080, and a bus 15090.

A table of the same type as that shown in FIG. 10 is used for the performance information 15500, while a table of the same type as that shown in FIG. 11 is used for the configuration information 15310.

Figure 16:
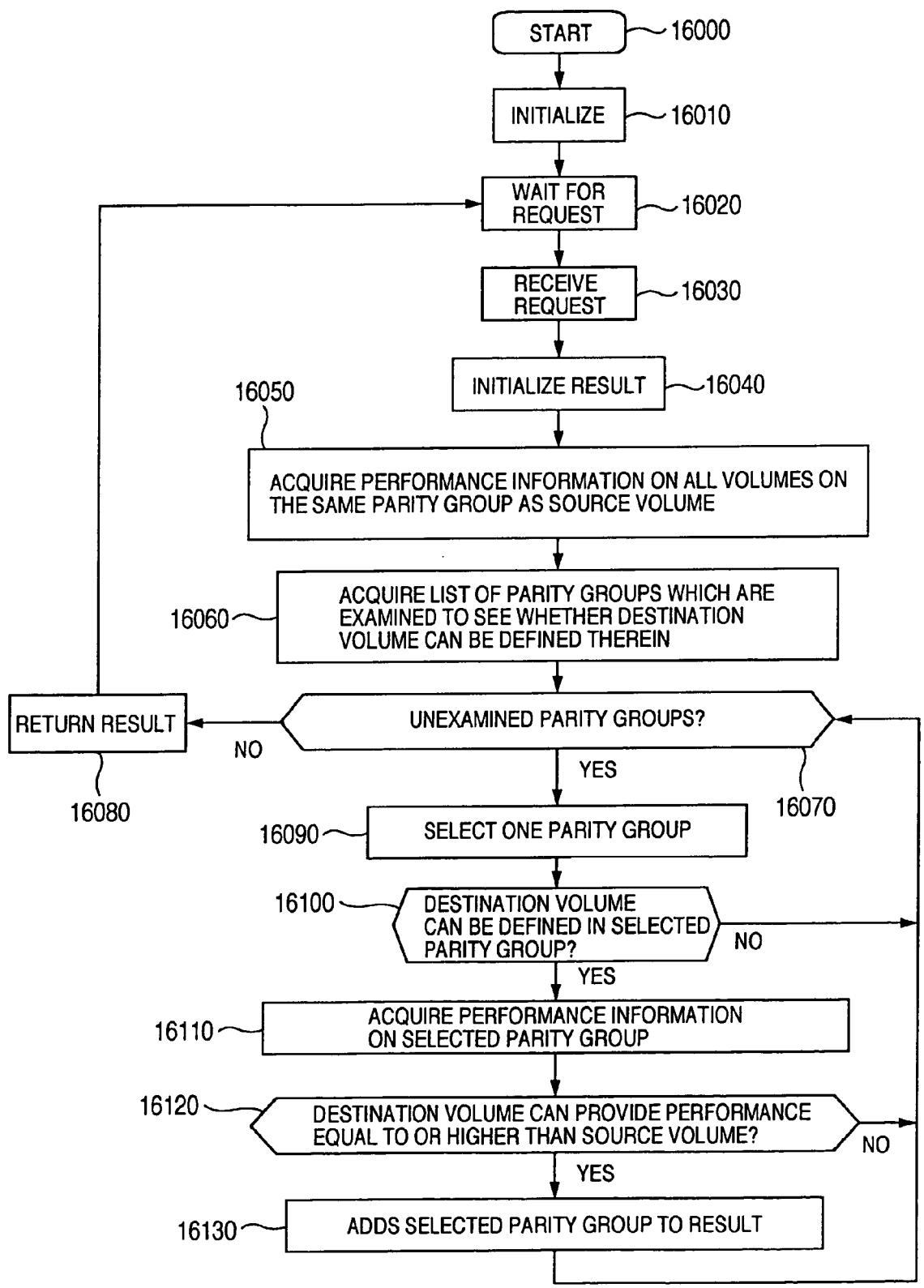
FIG. 16 is a flow diagram illustrating the processing performed by a request processing unit 15100 to acquire a parity group list which shows parity group candidates in which a destination volume can be defined in the third embodiment.

FIG. 16 illustrates the flow of the processing performed by the request processing unit 15100 in the third embodiment.

After starting the processing (at step 16000), the request processing unit 15100 initializes internal variables at step 16010. Then, at step 16020, the request processing unit 15100 waits for a request for acquiring a list of parity groups which satisfy the first condition from a computer which utilizes the storage apparatus 15000.

As the request arrives, the request processing unit 15100 receives the request from the communication unit 15900 at step 16030, and initializes (empties) a parity group list which is returned as a result at step 16040. Next, at step 16050, the request processing unit 15100 acquires a list of all volumes which are defined on the parity group on which a source volume specified together with the request is defined, and the performance information on each of the volumes included in the volume list from the configuration information management unit 15300 and performance information management unit 15400, respectively. Here, the performance information acquired from the performance information management unit 15400 refers to a value (hereinafter called the "performance value") which is predicted with the aid of the performance information 15500 and performance prediction table 15550 (an appropriate prediction method will be described later).

Next, at step 16060, the request processing unit 15100 acquires from the configuration information management unit 15300 a list of party groups in the storage apparatus 15000 which are searched for use as a destination parity group. The list does not include a parity group in which the source parity group is defined.

Subsequently, at step 16070, the request processing unit 15100 examines the list of parity groups acquired at step 16060 to see whether there are parity groups which are not processed at step 16090. If there is no such parity groups, the request processing unit 15100 returns the current destination parity group list through the communication unit 15900 as a result for the request at step 16080, and returns to step 16020 to continue the processing.

On the other hand, if the result of the examination at step 16070 shows that there are parity groups which have not been processed at step 16090, the request processing unit 15100 selects one from the parity groups at step 16090, and examines at step 16100 whether or not a destination volume corresponding to the source volume specified on the parity group can be defined on the selected parity group. In the third embodiment, the request processing unit 15100 determines that a destination volume can be defined on a parity group when the same capacity of volume as the source volume can be defined on the parity group. For examining at step 16100 whether or not a destination volume can be defined in the parity group, the request processing unit 15100 may compare a parity group in which the source volume resides with a parity group in which the destination volume resides in terms of an arbitrary attribute, in a manner similar to step 8008, rather than examining whether or not the parity group has an empty region wide enough to define the volume.

At step 16100, if no destination volume can be defined in the destination volume, the request processing unit 15100 returns to step 16070 to continue the processing. On the other hand, if the destination volume can be defined as determined at step 16100, the request processing unit acquires the performance information on the selected parity group from the performance information management unit 15400 at step 16110. The performance information, herein mentioned, refers to the result of evaluating the performance value for the selected parity group by calculating the equation in FIG. 9.

Next, at step 16120, the request processing unit 15100 examines whether or not a destination volume defined in the selected parity group can provide higher performance than the source volume from the performance values acquired at steps 16050 and 16110. In this event, the request processing unit 15100 determines that the destination volume provides higher performance than the source volume if the performance value acquired at step 16050 is larger than the performance value acquired at step 16110. When determining at step 16120 that a destination volume, even if created on the selected parity group, would not provide higher performance than the source volume, the request processing unit 15100 returns to step 16070 to continue the processing.

On the other hand, when determining at step 16120 that a destination volume created on the selected parity group can provide higher performance than the source volume, the request processing unit 15100 adds the selected parity group to the list of parity groups which satisfy the first condition at step 16130, and then returns to step 16070 to continue the processing.

FIG. 22 shows an exemplary screen which displays the result of a search for destination parity groups. Specifically, FIG. 22 shows an example of the search result in the third embodiment displayed on the screen, wherein assuming that a specified volume 1 is a source volume, a destination volume 2 which provide higher performance than the source volume 1 during a copy can be created in parity groups which are displayed as the result of the search. The manager can select a parity group in which the destination volume 2 can be created by viewing the screen. A similar screen can be used to display parity groups which are searched on condition that a destination volume created therein provides the performance after a failover higher than the performance of the source volume before the failover, not only during a copy, as is the case in the third embodiment.

The screen 22000 shown in FIG. 22 comprises the total capacity of the source volume 22100; the current performance of the source volume (response time which is applied to the following as well) 22110; information on parity groups 22200-22260; a parity group name 22300; the total capacity of a region in the parity group in which no volume is allocated 22320; the current performance 22340 of a volume on the parity group; predicted performance 22360 of the volume 2 when the volume 2 is defined on the parity group and data written in the volume 1 is also written into the volume 2; and predicted performance 22380 of the volume 2 when a failover occurs so that a service performed using the volume 1 is taken over to the volume 2 defined on the parity group.

The following shows exemplary criteria with which the manager selects a destination.

The predicted performance during a copy is preferably slightly higher than the current performance of the source volume. This is intended to avoid allocating a volume which provides performance higher than necessity. Also, since a predicted value may include an error, a volume which provides slightly higher performance is safer than one which provides the same performance. Further, for avoiding a degradation in performance after a failover, a preferred parity group should present the predicted performance in the column 22380 higher than the current performance of the source volume (the value is smaller). Then, in consideration of a future volume allocation plan, the manager may select a parity group in which the volume 2 should be defined with reference to the free capacity in the column 22320 (for example, allocating from a storage region which has the closest possible empty region to the capacity of the source volume).

Figures 17, 18:
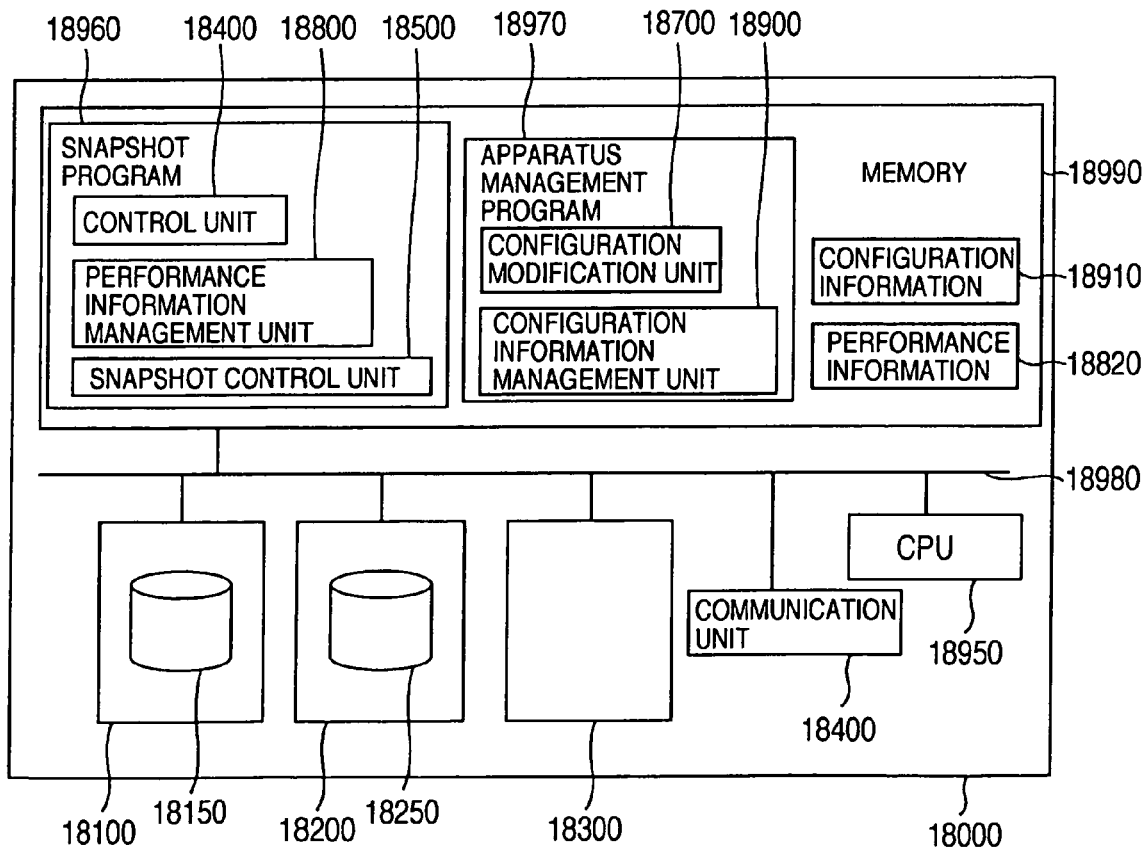
FIG. 17 shows a performance prediction table for use in a prediction of the performance in the third embodiment.
FIG. 18 is a block diagram illustrating the configuration in a storage apparatus 2200 in a fourth embodiment.

FIG. 17 shows an example of the performance prediction table 15550. The performance prediction table is provided for predicting the performance of a certain volume. A column 17000 shows the sum of the total numbers of requests made per unit time to all volumes on a parity group in which the volume is defined, and a column 17010 shows a predicted access time in the column 17000. A row 17100 shows a label given to the value indicated in each column, and may be omitted. Each of rows 17110, 17120, 17130, 17140 shows a set of a range of the total number of requests and a predicted access time for such a number of requests.

While fixed values are used in the column 17010, they may be replaced with a pointer to a function for calculating a predicted access time, or a function number given to the function. The function for calculating a predicted access time may use the values in the column 17000. The performance information provided by the performance information management unit 15400 at steps 16050 and 16110 is the value calculated from the table shown in FIG. 17.

At step 16050, the request processing unit 15100 references the table of FIG. 17 to find a predicted access time based on the sum of the numbers of requests made per unit time (called the "first predicted value" in the third embodiment) to all volumes on the same parity group in which the source volume is defined.

Then, at step 16110, the request processing unit 15100 references the table of FIG. 17 to find a predicted access time (called the "second predicted value" in the third embodiment) based on the sum of the number of requests made per unit time to all volumes on the selected parity group.

Next, at step 16120, the request processing unit 15100 determines that a destination volume defined on the selected parity group can provide the performance higher than that of the source volume if the first predicted value is smaller than the second predicted value.

In the third embodiment, the processing performed by the request processing unit 15100 may not be executed in the storage apparatus 15000 but on a computer external to the storage apparatus 15000. In this alternative, the computer acquires the configuration information 15310 and performance information 15500 through the communication unit 15900 to create a list of parity groups which satisfy the first condition.

The processing associated with the request processing unit 15100 may be executed on the host side to search not only for a snapshot which is a copy of a volume in a single storage apparatus but also for a parity group in which a destination volume is defined for a remote copy between different storage apparatuses.

Further alternatively, two or more storage apparatuses may be searched for a list of parity groups which satisfy the first condition.

While parity groups searched in the third embodiment are only those which satisfy the first condition, a region in which a parity group that satisfies the first condition can be defined may be searched in a physical disk in which no parity group is defined.

In a fourth embodiment described below, it is examined at the outset of an inter-volume copy using the snapshot function whether or not the performance of a destination volume during the copy can degrade lower than the performance of a source volume. If the degradation in the performance of the destination volume is probable, volumes, except for the destination volume, defined on the same parity group as the destination volume, are moved to another parity group to eliminate the probability, before data on the source volume is copied to the destination volume. In addition, the source volume and destination volume are associated with each other in such a manner that data written in the source volume is also written into the destination volume. Then, the snapshot based copy is started.

It should be noted that if the probability cannot be eliminated, the copy is terminated as a fault before starting. The probability is determined from a predicted value. The system configuration in the fourth embodiment is similar to that illustrated in FIG. 3.

FIG. 18 illustrates in a block diagram form the configuration in a storage apparatus 2200 in the fourth embodiment.

A parity group 18100, a parity group 18200, and a parity group 18400 are defined in storage apparatus 18000. A volume 18150 is defined in the parity group 18100, while a volume 18250 is defined in the parity group 18200.

A memory 18990 in the storage apparatus 18000 stores configuration information 18910 related to volumes and parity groups in the storage apparatus 18000, and performance information 18820 related to the volumes and parity groups in the storage apparatus 18000. The memory 18990 also comprises a configuration information management unit 18900 for managing the configuration information 18910, and a performance information management unit 18800 for managing the performance information 18820.

The memory 18990 also comprises a configuration modification unit 18700 for changing the configuration information 18910; a snapshot control unit 18500 for controlling a snapshot in the storage apparatus 18000; and a control unit 18400. The control unit 18400 receives a request for starting a copy between two specified volumes utilizing the snapshot function. The control unit 18400 adjusts the performance if a destination volume provides the performance lower than a source volume, and starts the requested snapshot with the aid of the snapshot processing unit 18500 when the performance adjustment improves the performance of the destination volume over the performance of the source volume. If the performance adjustment fails to improve the performance of the destination volume over the performance of the source volume, the control unit 18400 aborts the request as a fault.

The storage apparatus 18000 also comprises a communication unit 18400 for communicating with a computer and a communication device external to the storage apparatus 18000. The control unit 18400, performance information management unit 18800, and snapshot control unit 18500 are included in a snapshot program, while the configuration modification unit 18700 and configuration information management unit 18900 are included in an apparatus management program. The storage apparatus 18000 also comprises a CPU 18950, and a bus 18980. Tables of the same types as those shown in FIGS. 10 and 11 are used for the performance information 18820 and configuration information 18910, respectively.

Figure 19:
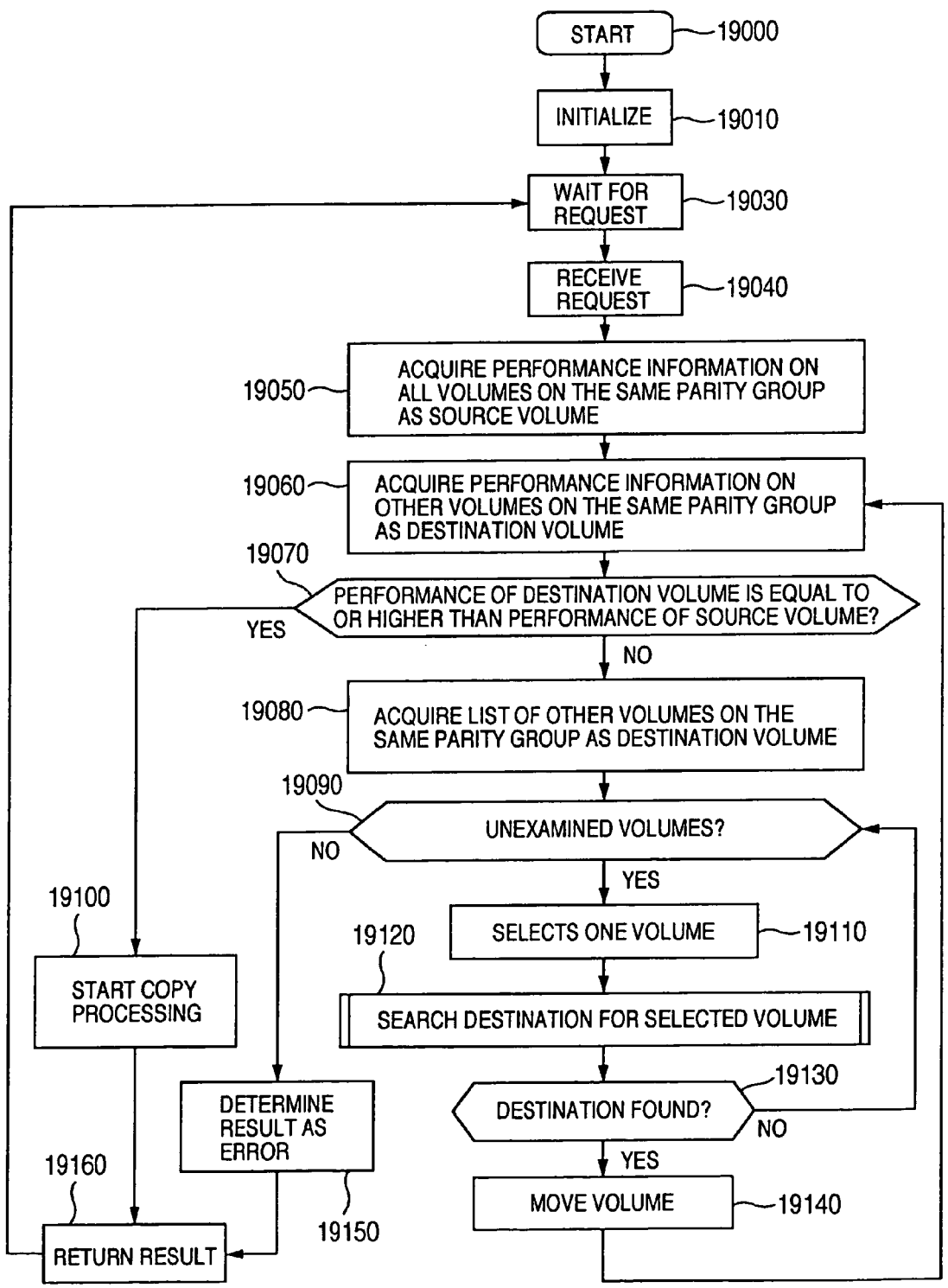
FIG. 19 is a flow diagram illustrating the processing in a control unit 18400 in the fourth embodiment.

FIG. 19 illustrates the flow of the processing performed by the control unit 18400.

After starting the processing (at step 19000), the control unit 18400 initializes internal variables at step 19010, and waits for a snapshot start request sent thereto at step 19030. As the request is sent, the control unit 18400 receives the request through the communication unit 18400 at step 19040. Then, at step 19050, the control unit 18400 acquires performance information on all volumes defined on a parity group on which a source volume is defined, from the configuration information management unit 18900 and performance information management unit 18800. The performance information, used herein, refers to the value resulting from the calculation of the equation in FIG. 9 for each volume (hereinafter, the value acquired at step 19050 is called the "first performance value" in the fourth embodiment).

Next, at step 19060, the control unit 18400 acquires performance information (result of evaluating the performance value calculated by the equation in FIG. 9) on all volumes defined on a parity group in which a destination volume is defined (hereinafter, the value acquired at step 19060 is called the "second performance value" in the fourth embodiment). Then, at step 19070, the control unit 18400 determines whether or not the performance of the destination volume is equal to or higher than the performance of the source volume. The determination at step 19070 is actually made as to whether the second performance value is equal to or larger than the first performance value. If the second performance value is equal to or larger than the first performance value, the control unit 18400 responds to the request at step 19100 by associating the source volume with the destination volume, starting the snapshot processing, and returns the result through the communication unit 18400 at step 19160.

On the other hand, if the second performance value is less than the first performance value, the control unit 18400 acquires a list of all volumes, except for the destination volume, on the same parity group in which the destination volume is defined at step 19080. At next step 19090, the control unit 18400 determines whether or not there are volumes which have not been processed at step 19110 after step 19080 was executed. If such volume is not found, the control unit 18400 determines the result as an error at step 19150, and returns the result to the requester through the communication unit 18400 at step 19160.

On the other hand, if it is found at step 19090 that there are volumes which have not been processed at step 19110 after step 19080 was executed, the control unit 18400 selects one of the volumes at step 19110, and searches at step 19120 for a destination to which the volume can be moved. The processing at step 19120 is similar to that at step 7020 (see FIG. 7).

At next step 19130, the control unit 18400 examines whether or not the result at step 19120 is empty, and if so, returns to step 19090 to continue the processing. On the other hand, if the result is not empty, the control unit 18400 moves the volume to a parity group resulting from the search with the aid of the configuration modification unit 18700 at step 19140, and returns to step 19060 to continue the processing.

In the strategy shown in the fourth embodiment, if the performance of the destination volume is lower than the performance of the source volume, the destination volume is moved to another parity group. Alternatively, another strategy may move those volumes except for the destination volume which are defined on the same parity group as the destination volume. In addition, the strategy of moving the destination volume may be combined with the strategy of moving those volumes except for the destination volume which are defined on the same parity group as the destination volume.

Next, in a fifth embodiment of the present invention described below, the performance of the destination volume is adjusted after a failover.

In the fifth embodiment, the performance information on a destination volume is transferred to a storage apparatus in which the destination volume is defined each time the configuration is modified in a storage apparatus in which a source volume is defined, or at least once per 256 data copies. The performance information transferred to the storage apparatus is stored in the storage apparatus in which the destination volume is defined, so that the performance of the destination volume is adjusted using the stored performance information upon occurrence of a failover.

Figure 20:
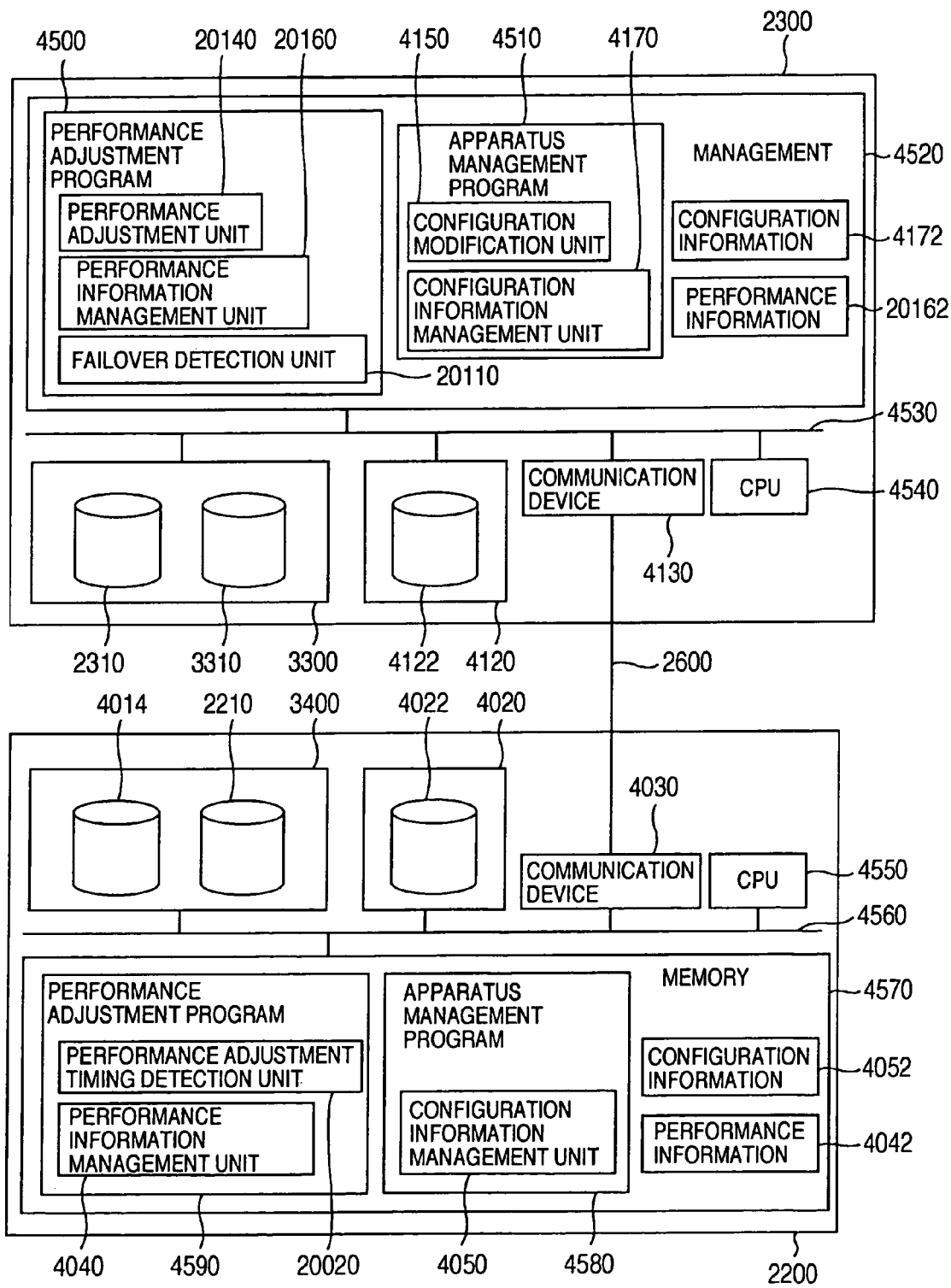
FIG. 20 is a block diagram illustrating the configuration in a storage apparatus 2200 and a storage apparatus 2300 in a fifth embodiment.

FIG. 20 illustrates in a block diagram form the configuration in storage apparatuses in the fifth embodiment.

Components in FIG. 20 except for a performance adjustment unit 20140, a performance information management unit 20160, performance information 20162, and a failover detection unit 20110 are similar to those described in connection with FIG. 4 which illustrates the configuration of the first embodiment. The flow of processing performed by the communication device 4030 is similar to the method illustrated in FIG. 5. The flow of processing performed by the communication device 4130 in turn is similar to the flow of processing illustrated in FIG. 6 except that the performance information is transferred to the performance information management unit 20160 instead of the performance adjustment unit 4140 at step 6016.

A configuration modification detection unit 20020 monitors the configuration information 4052 managed by the configuration information management unit 4050 until the configuration information 4052 is modified, and sends a configuration modification notice to the communication device 4030 if such a modification is found.

The performance information management unit 20160 in turn stores performance information 20162 on volumes and parity groups in the storage apparatus 2300 as well as performance information on a volume 2210 which is the source of a remote copy in the storage apparatus 2200. The performance information 20162 holds performance information related to the storage apparatus 2300 and storage apparatus 2200 in the format shown in FIG. 10.

The failover detection unit 20110 monitors for the occurrence of a failover, and upon detection of the occurrence of a failover, invokes the performance adjustment unit 20140 to adjust the performance of a volume 2310. The performance adjustment unit 20140 adjusts the performance of the volume 2310 with the aid of the configuration modification unit 4510 and the performance information 20162 held by the performance information management unit 20160.

Here, the failover detection unit 20110 monitors for a data read request to the volume 2310, and determines that a failover occurs when the request is received, causing a waiting server to start processing, and starts the performance adjustment by the performance adjustment unit 20140. The failover detection unit 20110 is not limited to the foregoing method of monitoring the occurrence of a failover, but may periodically monitor the storage apparatus 2200 through the communication path 2600 or a separately provided communication path, or wait for a failover occurrence notice from the host side.

Figure 21:
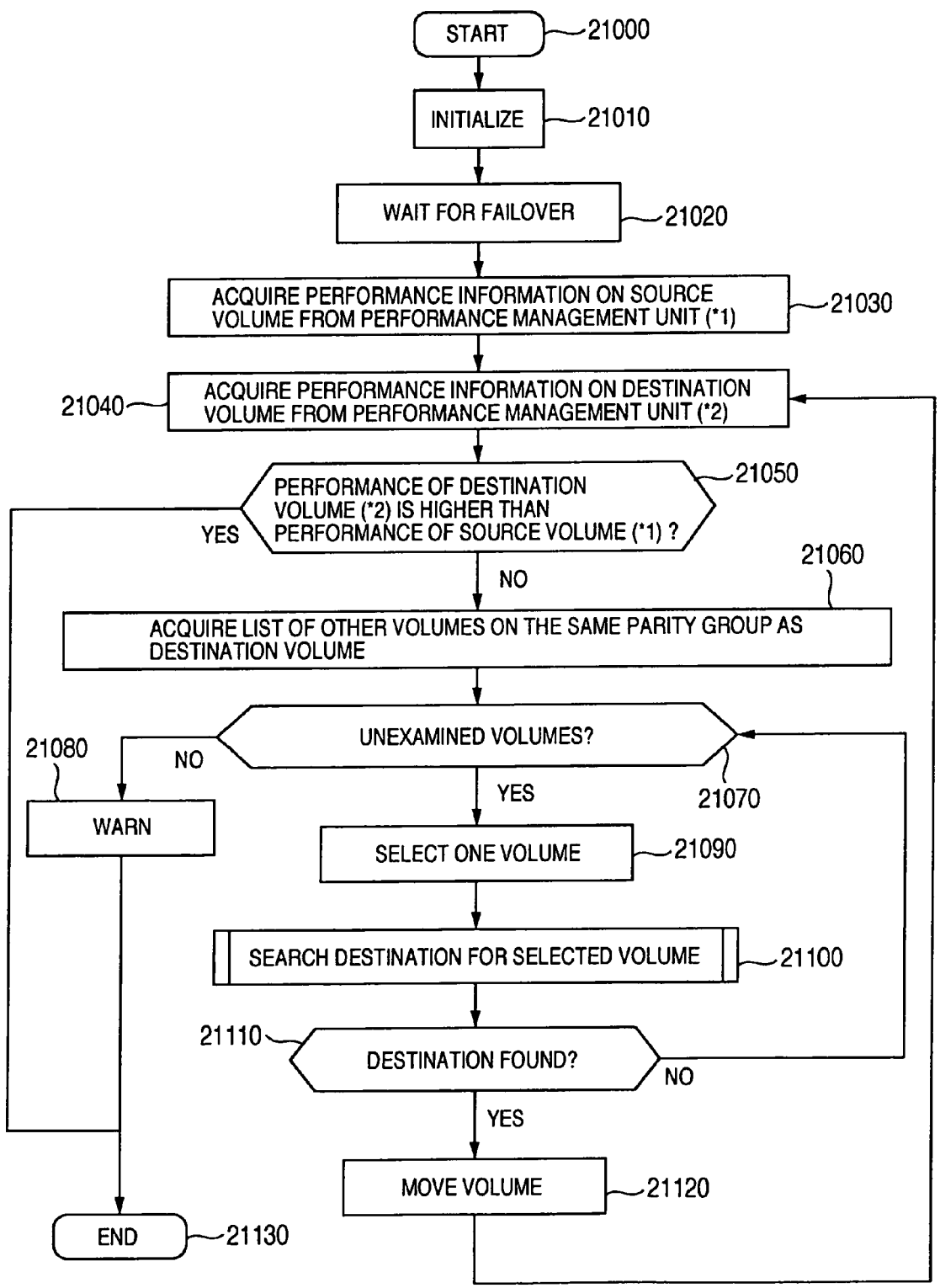
FIG. 21 is a flow diagram illustrating a procedure executed by a performance adjustment unit 20140 to adjust the performance in the fifth embodiment.

FIG. 21 illustrates the flow of the processing performed by the performance adjustment unit 20140 in FIG. 20.

After starting the processing (at step 21000), the performance adjustment unit 20140 initializes internal data at-step 21010. Next, at step 21020, the performance adjustment unit 20140 waits for a failover detection notice from the failover detection unit 20110. Then, at step 21030, the performance adjustment unit 20140 acquires previously stored performance information on the source volume 2210 before a failover from the performance information management unit 20160. At step 21040, the performance adjustment unit 20140 acquires performance information on the destination volume 2310 from the performance information management unit 20160. At step 21050, the performance adjustment unit 20140 compares the performance information on the source volume with the performance information on the destination volume, and determines that no performance adjustment is needed if the performance of the destination volume is higher than the performance of the source volume before a failover, followed by termination of the processing (step 21130).

If the performance of the destination volume is lower than the performance of the source volume before a failover, as determined at step 21050, the performance adjustment unit 20140 acquires a list of other volumes on the same parity as the destination volume at step 21060, and determines at step 21070 whether or not there is a volume in the list which has not been processed from step 21090 onward. If not, the performance adjustment unit 20140 notifies at step 21080 that the volume used after a failover has the performance lower than the volume which has been used before the failover, so that the overall system can be degraded in performance.

On the other hand, at step 21070, if there is a volume in the list which has not been processed at step 21090, the performance adjustment unit 20140 selects this volume at step 21090, and searches for a parity group to which the selected volume can be moved at step 21100. This step 21100 is executed in a manner similar to the method shown in FIG. 8.

Next, the performance adjustment unit 20140 determines at step 21110 from the result of the search conducted at step 21100 whether or not there is a parity group to which the selected volume can be moved. If there is such a parity group, the performance adjustment unit 20140 moves the selected volume to the found parity group with the aid of the configuration modification unit 4150 at step 21120, and returns to step 21040 to continue the processing.

If the performance adjustment unit 20140 determines at step 21110 that there is no destination to which the selected volume can be moved as a result of the search at step 21100, the performance adjustment unit 20140 returns to step 21070 to continue the processing.

In the foregoing first, second, and fifth embodiments, the present invention is implemented in a storage apparatus. Alternatively, an arbitrary processing unit in the storage apparatus 2200, storage apparatus 2300 and storage apparatus 12400 may be provided in any of the computer 2000, computer 2100, computer 3000, communication device 2400, communication device 2500, communication device 3600, computer 12000, computer 12100, communication device 12200, and communication device 12300.

Similarly, while in the third and fourth embodiments, the present invention is implemented in a storage apparatus, an arbitrary processing unit in the storage apparatus 15000 and storage apparatus 18000 may be provided in a computer external to the storage apparatus, or in a communication device external to the storage apparatus.

In the first, second and fifth embodiments, the performance information is transferred through the communication path 2600 between the storage apparatuses. Alternatively, the performance information may be transferred through a communication path between the storage apparatuses provided separately from a communication path through which data is transferred in association with an inter-volume data copy, or through a communication path between computers which utilize the respective storage apparatuses.

While in the first and fifth embodiments, the performance information is transferred at least once per 256 data transfers, the frequency at which the data is transferred is not limited to once per 256 transfers. Also, the frequency at which the data is transferred may be changed in accordance with a load on the communication path or a load on the source volume or destination volume. The frequency may further be changed in accordance with a predefined schedule.

Alternatively, the performance information may be transferred when the manager instructs so, on a periodic basis, or when the configuration is modified in an arbitrary storage apparatus (a storage apparatus in which the source volume or destination volume is defined, or the like) (creation, deletion, movement and the like of a volume and/or a parity group).

In the second embodiment, the performance adjustment made by the performance adjustment unit 13100 need not be triggered by the lapse of the waiting time, but may by started after the manager confirms the need for performance adjustment which has been stored, or after the manager, who has been notified, instructs the performance adjustment, or when an arbitrary configuration is modified in the storage apparatus in which the source volume is defined. For example, the performance of the destination volume may be adjusted when the function of "optimizing the performance through relocation of volumes," described in the prior art, is executed in the storage apparatus in which the source volume is defined to add any change (creation, deletion, movement or the like of a volume) to volumes on the parity group on which the source volume is defined.

The performance prediction used in the first, second, fourth and fifth embodiments relies on the performance value resulting from the calculation of the equation shown in FIG. 9. Alternatively, the performance prediction in any of the foregoing embodiments may involve calculating the performance values in accordance with the equation in FIG. 9 separately for a read request and a write request, and calculating the sum of the resulting performance values for use in the performance prediction, or may use an equation different from that shown in FIG. 9.

A performance evaluation item for use in an equation different from that shown in FIG. 9 may be an average access time per request.

As an alternative, the correspondence of the total number of requests to a predicted access time may be represented in a tabular form, as shown in the third embodiment, and a predicted value may be retrieved from the table without using the equation in FIG. 9. In this table, values may be changed depending on the total amount of transferred data, and the transfer capability in the specifications of physical disks. Further, the table may be created from past logs, or updated every certain time.

As another alternative, the performance of the destination volume may be determined by checking whether or not it is equal to or larger than a predefined value irrespective of the actual performance of the source volume.

The performance of the destination volume need not be always equivalent to or higher than the performance of the source volume, but instead, the performance value of the destination volume may be equal to or higher than a certain percentage (for example, 80% or higher) of the performance value of the source volume or may be within a certain range (for example, from 80% to 120%).

The predicted performance value found by any of the foregoing methods may be multiplied by a fixed value in accordance with the ratio of a specified value of the source volume to that of the destination volume. The "specified value" of a volume refers to an average of performance specifications of respective physical disks which make up a parity group in which the volume is defined, the latest value in the parity group, the sum of those, or the like.

The acquisition of the performance information described in the first, second and fifth embodiments may involve providing an extra volume for measuring the performance on the same parity group as the source volume or destination volume, actually accessing the volume for measuring the performance from a storage apparatus or a computer which can utilize the storage apparatus to measure the performance, and using the measured performance value. Instead of providing an extra volume, an existing volume may be used for measuring the performance.

For calculating the performance value in accordance with the equation shown in FIG. 9, or for calculating a predicted performance value from the performance prediction table shown in FIG. 17, only one of a read request or a write request may be included in the result of the calculation. In addition, whether or not the read request or write request should be included in the result of the calculation may be determined depending on whether the read request or write request is associated with an inter-volume copy from another storage apparatus or with other than that.

For example, in a calculation of a predicted performance value of the destination volume after a failover, the total number of write requests associated with inter-volume copies to the volume is subtracted from the total number of read requests and write requests of all volumes in which the volume is defined. The resulting difference and the sum of the total number of read requests and the total number of write requests to the source volume are calculated as the total number of requests to the volume, using the performance prediction table shown in FIG. 17.

In the first and fifth embodiments, arbitrary configuration information in the storage apparatus in which the source volume is defined may be transferred to the storage apparatus in which the destination volume is defined, together with the performance information, such that the performance of the destination volume is adjusted by changing the configuration of the storage apparatus in which the destination volume is defined in accordance with the transferred configuration information. Examples of the configuration information may include whether or not a cache resident function is used, and a processing priority for a request to the source volume.

In the first, second, third, fourth and fifth embodiments, the processing is performed on the assumption that the performance of volumes remains unchanged even if the time passes. Alternatively, performance values may be acquired every time zone, such that a failover would not cause a degradation in performance in all time zones or in a specified time zone, or such that the performance of the destination volume does not become lower than the performance of the source volume during a copy.

In the first, second, fourth and fifth embodiments, the performance of the destination volume is ensured after a failover by moving a volume which is defined on the same parity group as the destination volume. Alternatively, the destination volume itself may be moved to another parity group.

An alternative method of adjusting the performance of the destination volume may involve increasing or decreasing the capacity of a cache which is allocated to the volume or volumes other than that volume, defined on the same parity group as the volume, or giving a higher or lower processing priority to the volume. For increasing or decreasing the capacity of a cache, or for giving a higher or lower processing priority to a volume, predicted performance resulting from such operation can be calculated by increasing or decreasing the performance value before the operation by a fixed proportion, or by acquiring performance information which was provided when similar settings were made from past logs.

In the first, second and fourth embodiments, the performance of the destination volume is adjusted by moving a volume if the performance of the destination volume can be degraded below the performance of the source volume before and after a failover or during a copy. Alternatively, when such degradation is probable, the manager may be notified of the probability without adjusting the performance. Further alternatively, a means may be provided for confirming whether or not the performance of the destination volume can be degraded below the performance of the source volume in response to a request from the manager. This means may be used in a storage apparatus or a management software application running on a system which comprises a computer that uses the storage apparatus, such that a display format provided by the management software application may be varied based on information acquired by the means depending on whether or not the degradation is probable, or depending on the degree of the degradation (ratio of system performance before and after a failover, or the like).

While the first, second, fourth and fifth embodiments have been described in connection with adjustments of the performance by moving the destination volume, the performance of the volume may be adjusted using the function of "optimizing the performance through relocation of volumes" as described in the prior art. In this event, the performance information which is sent from the storage apparatus in which the source volume is defined to the storage apparatus in which the destination volume is defined may only include information required to notify the manager of a modification in configuration which involves the performance adjustment or an opportunity of making the performance adjustment.

When the present invention is used in combination with the function of optimizing the performance of each volume through relocation of volumes in a storage apparatus, as described in the prior art, the destination volume may not be relocated, or a parity group in which the destination volume is defined may not be assigned for the destination of the relocation.

In the first and second embodiments, the performance of the source volume before a failover is compared with the performance of the destination volume after the failover. Alternatively, the performance of the destination volume may be compared with the performance of the source volume during a copy such that the performance of the destination volume may be adjusted if the performance of the destination volume is lower than the performance of the source volume.

Similarly, while in the third and fourth embodiments, the performance of the source volume is compared with the performance of the destination volume during a copy, the performance of the source volume before a failover may be compared with the performance of the destination volume after the failover.

Further, in the first, second, third and fourth embodiments, the destination volume and source volume may be examined whether they satisfy the following conditions: (1) the performance of the destination volume is equal to or higher than the performance of the source volume during a copy; and (2) the performance of the destination volume after a failover is equal to or higher than the performance of the source volume before the failover, and if any of the two conditions is not established, the performance adjustment may be made through a movement of a volume and the like so that both the two conditions are established.

In the first, second, third, fourth and fifth embodiments, there are a single source volume and a single destination volume. The present invention, however, can be applied to a system which has two or more destination volumes. In this event, the performance adjustment should be made such that the performance of all destination volumes, a specified destination volume, or a specified number or more of destination volumes is improved over the performance of the source volume during a copy or after a failover.

While in the first, second, fourth and fifth embodiments, there is a single group of volumes, the performance of a destination volume may be adjusted such that the performance of the source volume in each of two or more sets of volumes is improved over the performance of an associated source volume during a copy or after a failover. In addition, the two or more sets of volumes may be given priorities, such that the performance of the destination volume may be adjusted as much as possible from the set which is given the highest priority.

When the performance adjustment is made for all of two or more sets of volumes, the performance can be predicted using the performance prediction table. In this event, a prediction of the performance of a destination volume in a certain set may involve checking whether or not there is a set of volumes which has a destination volume on the same parity group as a volume, the performance of which is to be predicted, in other sets of volumes, and if there is such a set, calculating the total number of requests and the total amount of transferred data, required for referencing the performance prediction table using the value of the source volume in that set, instead of the value of the destination volume in that set, thereby predicting the performance of a volume used after a failover.

While in the first, second and fifth embodiment, there are two computers which utilize the storage apparatuses, the two computers may be replaced by one and the same computer. Specifically, the present invention can be applied as well to a system in which one computer references a first volume when an inter-volume copy is under progress between the first volume and a second volume, and switches to the second volume to continue the processing if the first volume fails. In this event, an examination is made as to whether or not the performance of the second volume during a copy or after the end of the copy can be degraded below the performance of the first volume during the copy, and the performance of the destination volume is adjusted if such degradation is probable.

Next, in a sixth embodiment of the present invention described below, a volume A and a volume B are assigned, and an inter-volume copy from the volume A to the volume B is started utilizing a remote copy function. An examination is made as to whether or not the performance of the volume B after a failover is degraded below the performance of the volume A before the failover. If such degradation is probable, a volume defined on the same parity group as the volume B is moved to another parity group to eliminate the probability.

Figure 23:
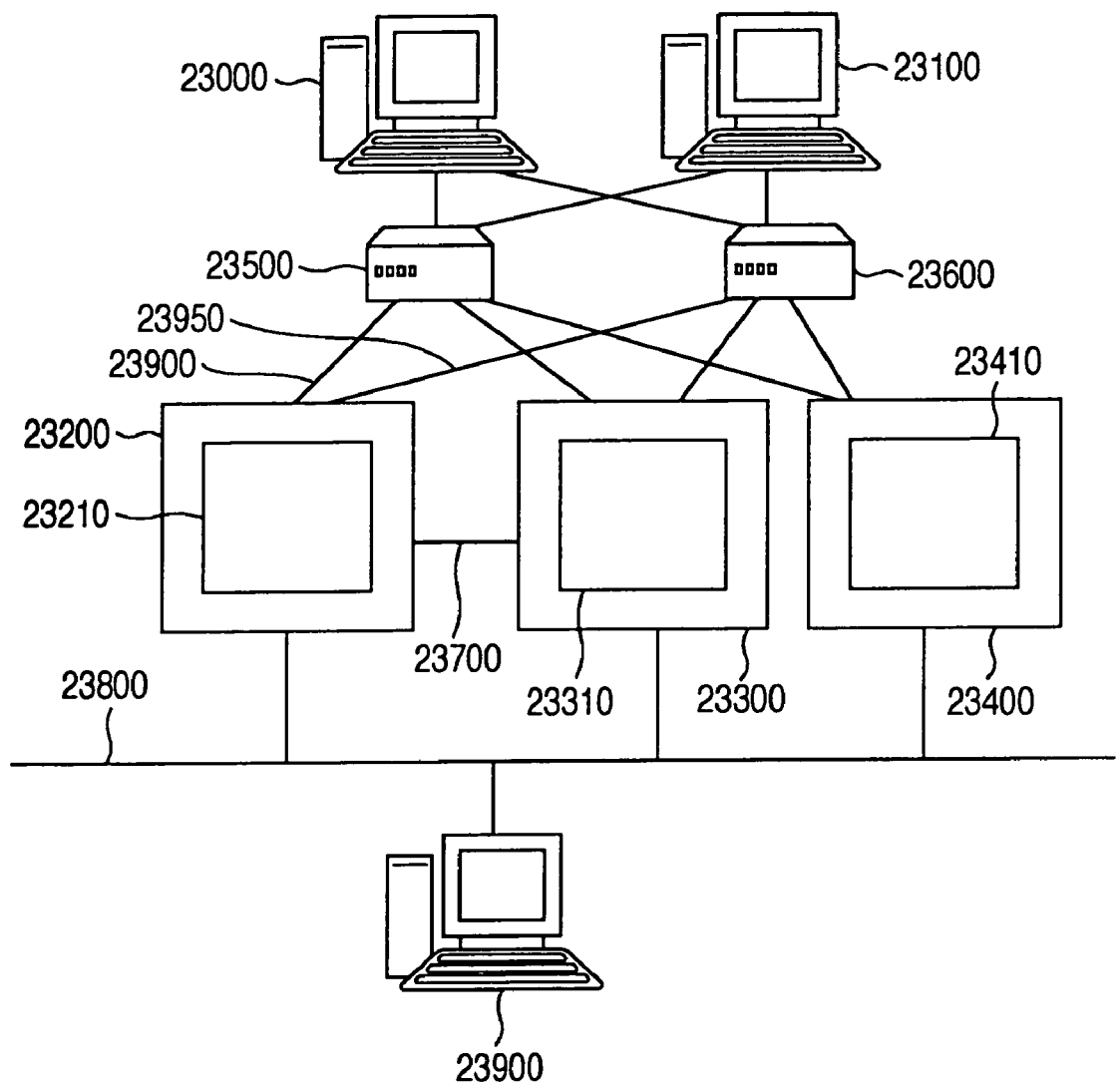
FIG. 23 is a diagram illustrating the configuration of a system in a sixth embodiment.

FIG. 23 illustrates the configuration of a system according to the sixth embodiment.

Computers 23000, 23100 are both connected to communication devices 23500, 23600, both of which in turn are connected to storage apparatuses 23200, 23300, 23400. A communication path 23900 is provided between the communication device 23500 and storage apparatus 23200, while a communication path 23950 is provided between the communication device 23600 and storage apparatus 23200. The storage apparatus 23200 and storage apparatus 23300 are connected to a communication path 23700. A parity group 23210 is defined in the storage apparatus 23200; a parity group 23310 in the storage apparatus 23300; and a parity group 23410 in the storage apparatus 23400. The computers 23900, 23200, 23300, 23400 are all connected to a communication path 23800.

Upon start of the system operation, an application runs on the computer 23000, and uses the volume A defined in any of the storage apparatuses 23200, 23300, 23400 to provide a service. Then, as a fault occurs in the computer 23000 or storage apparatus in which the volume A is defined, the computer 23100 executes the application which uses the volume B defined in a different storage apparatus from that in which the volume A is defined to process the service. The computer 23900 modifies the configuration of volumes in the storage apparatuses 23200, 23300, 23400, and modifies the configuration of paired volumes.

Figure 24:
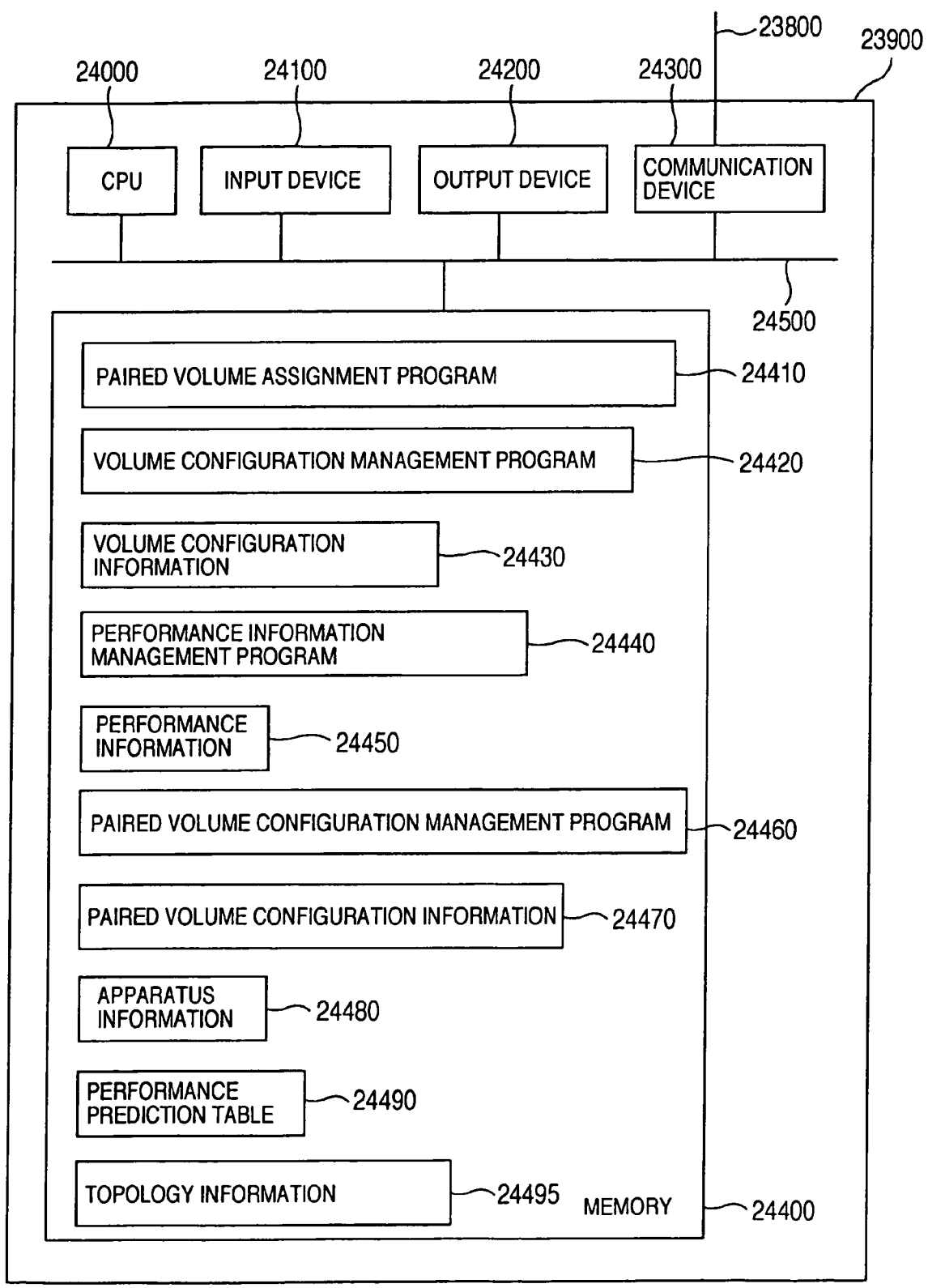
FIG. 24 is a block diagram illustrating the configuration in a computer 23900 in the sixth embodiment.

FIG. 24 illustrates the configuration in the computer 23900. A CPU 24000, an input device 24100, an output device 24200, a communication device 24300, and a memory 24400 are interconnected through a communication path 24500. The communication device 24300 is connected to the communication path 23800.

The memory 24400 stores a paired volume assignment program 24410, a volume configuration management program 24420, a performance information management program 24440, a paired volume configuration management program 24460, volume configuration information 24430, performance information 24450, paired volume configuration information 24470, apparatus information 24480, a performance prediction table 24490, and topology information 24495.

The programs stored in the memory 24400 reside in either of the storage apparatuses 23200, 23300, 23400, and are read into the memory 24400 through the communication path 23800, and executed by the CPU 24000. The program modules may be stored on a recording medium (flexible disk, CD-ROM, DVD-ROM, semiconductor memory, transmission paths such as LAN and SAN, or the like) which can be read by the CPU 24000. Alternatively, functions provided by the program modules may be implemented by hardware configurations (semiconductor integrated circuits such as LSI (Large Scaled Integration) and the like). The information stored in the memory 24400 are all collected by the programs in the memory 24440 from the storage apparatuses 23200, 23300, 23400, or entered by the user from the input device 24100.

The volume configuration information 24430 comprises volume configuration information in the format shown in FIG. 11 for each of the storage apparatuses. Likewise, the performance information 24450 comprises performance information in the format shown in FIG. 10 for each of the storage apparatuses. The apparatus information 24480 provides a list of storage apparatuses which can be controlled by the computer 23900, i.e., the storage apparatuses 23200, 23300, 23400 in the sixth embodiment. The performance prediction table 24490 is the same in format as the table shown in FIG. 17. The topology information 24495 provides a list which shows storage apparatuses enumerated in the apparatus information 24480 between which a remote copy can be made, i.e., a list of apparatus sets.

In the sixth embodiment, the list stores the storage apparatus 23200 and storage apparatus 23300 in pair. The volume configuration management program 24420 assigns a volume onto and releases a volume from a parity group in a specified storage apparatus, and acquires configuration information on a volume in a specified storage apparatus.

The performance management program 24440 collects the performance of volumes in the storage apparatuses 23200, 23300, 23400 from the respective storage apparatuses, stores the collected performance information 24450, and provides the contents of the performance information 24450 in response to a request. The paired volume configuration management program 24460 communicates with the storage apparatuses 23200, 23300, 23400 as required to start and stop a remote copy between two specified volumes, captures paired volume configuration information in a specified storage apparatus into the paired volume configuration information 24470, and provides the contents of the paired volume configuration information 24470 in response to a request.

Figure 25:
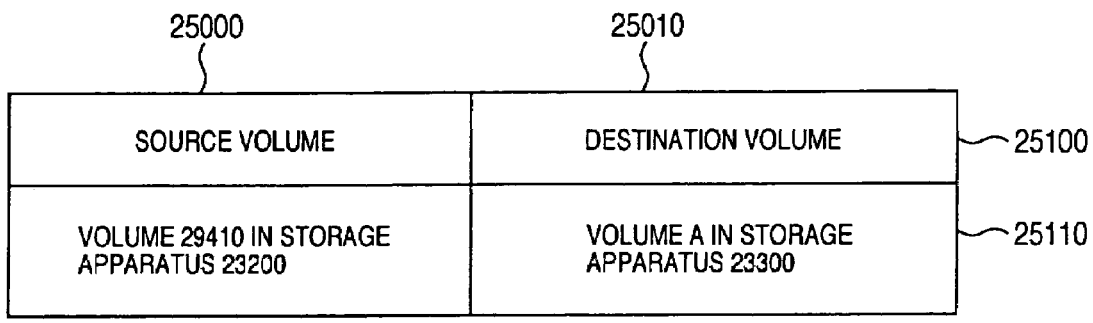
FIG. 25 shows pair volume configuration management information 24470 in the sixth embodiment.

FIG. 25 shows an example of the paired volume configuration information 24470 in FIG. 24. Rows 25000, 25010 show a source volume and a destination volume of a remote copy pair, respectively. A column 25100 shows a label of contents included in each column, and a column 25100 shows one pair of volumes in one row.

Figure 26:
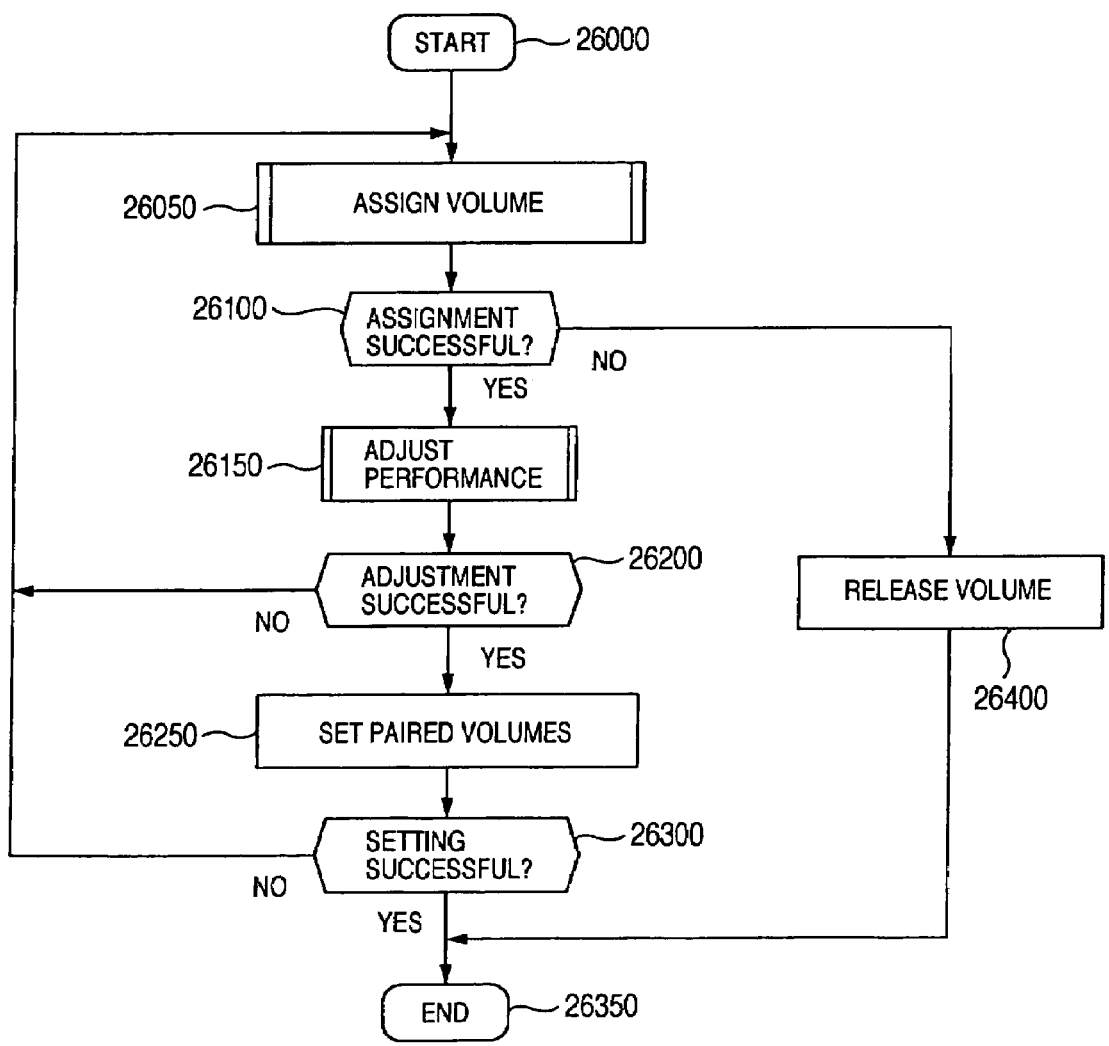
FIG. 26 is a flow diagram illustrating the processing performed by a pair volume assignment program 24410 in the sixth embodiment.

FIG. 26 illustrates the flow of the processing performed by the paired volume assignment program 24410 in FIG. 24.

After starting the processing (at step 26000), the program 24410 assigns a volume A and a volume B to two storage apparatuses, respectively, which can support a remote copy, with the aid of the volume configuration management program 24420. In this event, the program 24410 specifies appropriate conditions such as the capacities of the assigned volumes, the configuration of parity groups to which the volumes are assigned, and the like. Then, the program 24410 determines at step 26100 whether or not the assignment is successful. If the assignment is successful, the program 24410 performs a performance adjustment with the aid of the volume configuration management program 24420 and performance information management program 24440 such that the performance of the volume B after a failover is not degraded below the performance of the volume A before the failover. If the performance adjustment is successfully carried out (step 26200), the program 24410 establishes a relationship for performing a remote copy between the volumes assigned at step 26050 with the aid of the paired volume configuration management program (at step 26250). If the relationship is successfully established at step 26250 (step 26300), the program 24410 terminates with the successful processing (step 26350).

If the program 24410 determines at step 26200 or 26300 that the performance adjustment at step 24420 or the establishment of the relationship at step 26250 fails, the program 24410 continues the processing form step 26050. On the other hand, if the program 24410 determines at step 26100 that the assignment fails, the program 24410 starts the processing illustrated in FIG. 26, and then at step 26400, releases all the volumes which have been assigned at step 26050.

Figure 27:
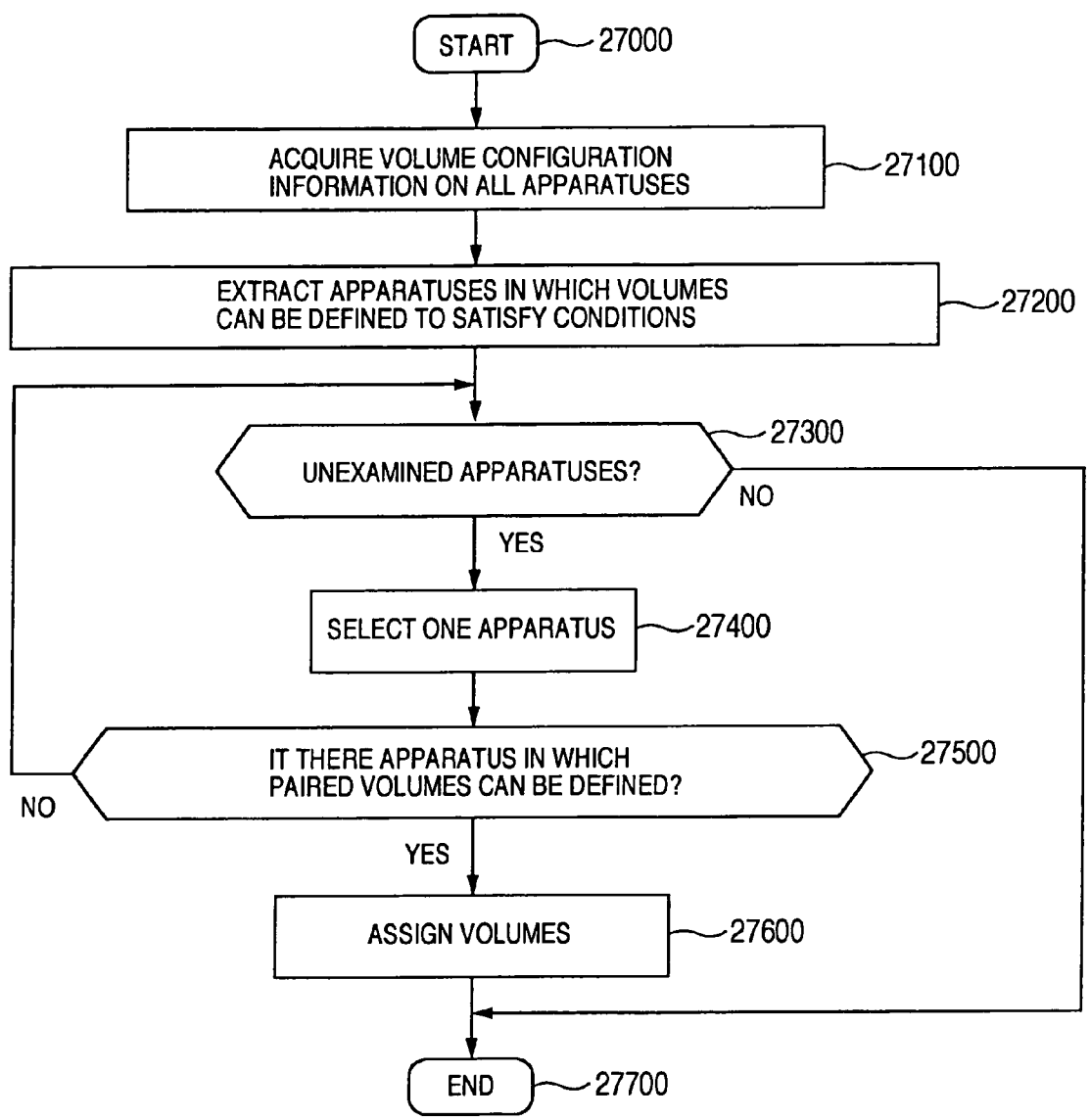
FIG. 27 is a flow diagram illustrating the processing at volume assignment step 26050 in the sixth embodiment.

FIG. 27 illustrates the flow of the volume assignment at step 26050 in FIG. 26.

After starting the processing (at step 27000), the program 24410 captures configuration information on all volumes defined in the storage apparatus stored in the apparatus information 24480 into the volume configuration information 24430 from these storage apparatuses with the aid of the volume configuration management program 24420 (at step 27100). Then, at step 27200, the program 24410 extracts from the result of step 27100 those storage apparatuses in which volumes can be defined so as to satisfy the conditions such as the specified capacities, configuration of parity groups and the like. Next, the program 24410 determines at step 27300 whether or not the extracted storage apparatuses include those which have not been processed at step 27400. If there is no such storage apparatus, the program 24410 terminates the processing on the assumption that no volume can be assigned (step 27700).

If the program 24410 determines at step 27300 that there are storage apparatuses which have not been processed at step 27400, the program 24410 selects one of the storage apparatuses (step 27400), examines whether or not there is a storage apparatus in which a volume can be defined to permit a remote copy with a volume in the selected storage apparatus with reference to the topology information 24495 (step 27500), and returns to step 27300 if there is no such storage apparatus.

If a storage apparatus as mentioned above is found as the result of the examination, the program 24410 defines the volume A in the storage apparatus selected at step 27400, and the volume B in the storage apparatus found at step 27500 (at step 27600), and terminates the processing with the successful assignment (step 27700).

Figure 28:
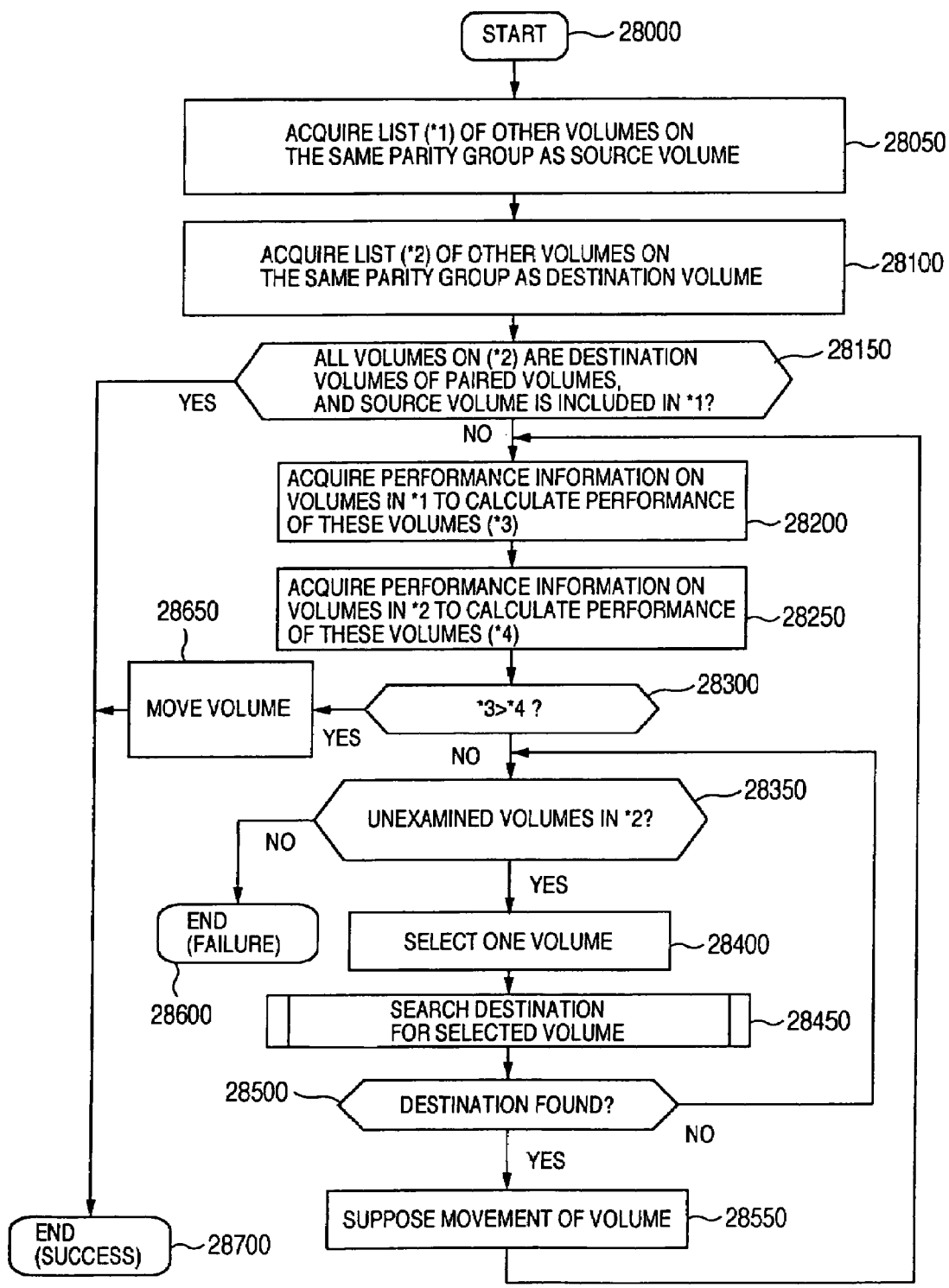
FIG. 28 is a flow diagram illustrating the processing at a performance adjustment step 26150 in the sixth embodiment.

FIG. 28 illustrates the flow of the processing at step 26150 in FIG. 26.

Upon start of the processing (at step 28000), the program 24410 acquires a list of volumes except for the volume A defined in the same parity group as the volume A from the volume configuration information 24430 with the aid of the volume configuration management program 24420 (step 28050). Next, the program 24410 acquires a list of volumes except for the volume B defined on the same parity group as the volume B from the volume configuration information 24430 with the aid of the volume configuration management program 24420 (at step 28100).

Next, the program 24410 examines whether or not every volume acquired at step 28100 satisfies conditions which state that the volume is the destination of a remote copy, and that the source volume is included in the list acquired at step 28150. If the result of the examination shows that every volume satisfies the conditions, the program 24410 terminates with the successful processing at step 28700. On the other hand, if every volume does not satisfy the conditions, the program 24410 continues the processing from step 28200 (at step 28150).

Next, at step 28200, the program 24410 acquires performance information on all the volumes included in the result acquired at step 28050 to calculate the performance for the volumes in a method later described. Next, at step 28250, the program 24410 acquires performance information on all the volumes included in the result acquired at step 28100 except for those volumes which would be moved in the processing at step 28550 if the processing at step 28550 has been terminated, and calculates the performance for the volumes.

At respective steps 28200, 28250, the program 24410 captures the performance information on respective volumes from associated storage apparatuses into the performance information 24450 with the aid of the performance information management program 24440, calculates the sum of the numbers of requests to respective volumes included in the performance information, and calculates the performance of all the volumes using the performance prediction table 24490.

Next to step 28250, if the performance calculated at step 28200 is higher than the performance calculated at step 28250 (at step 28300), the program 24410 continues the processing from step 28650. Otherwise, the program 24410 continues the processing from step 28350. Then, at step 28350, if there are those volumes which have not been processed from step 28400 onward in the list acquired at step 28100, the program 24410 selects one of the volumes at step 28400, and continues the processing from step 28450.

If the program 24410 determines at step 28350 that there is no volume which has not been processed from step 28400 onward, the program 24410 terminates the processing on the assumption that the performance adjustment fails (at step 28600). Next to step 28400, the program 24410 searches for another parity group to which the volume selected at step 28400 can be moved (step 28450). The program 24410 continues the processing from step 28350 if there is no parity group as mentioned, or continues the processing from step 28550 if there is such a parity group (step 28500).

The program 24410 supposes at step 28550 that the volume selected at step 28400 is moved to the destination which is found as the result of the processing at step 28450, and returns to step 28200 to continue the processing therefrom. On the other hand, at step 28650, if a movement of the volume has been supposed at step 28550, the program 24410 actually moves the volume in accordance with the supposition, followed by termination of the processing with the successful performance adjustment (step 28700).

Figure 29:
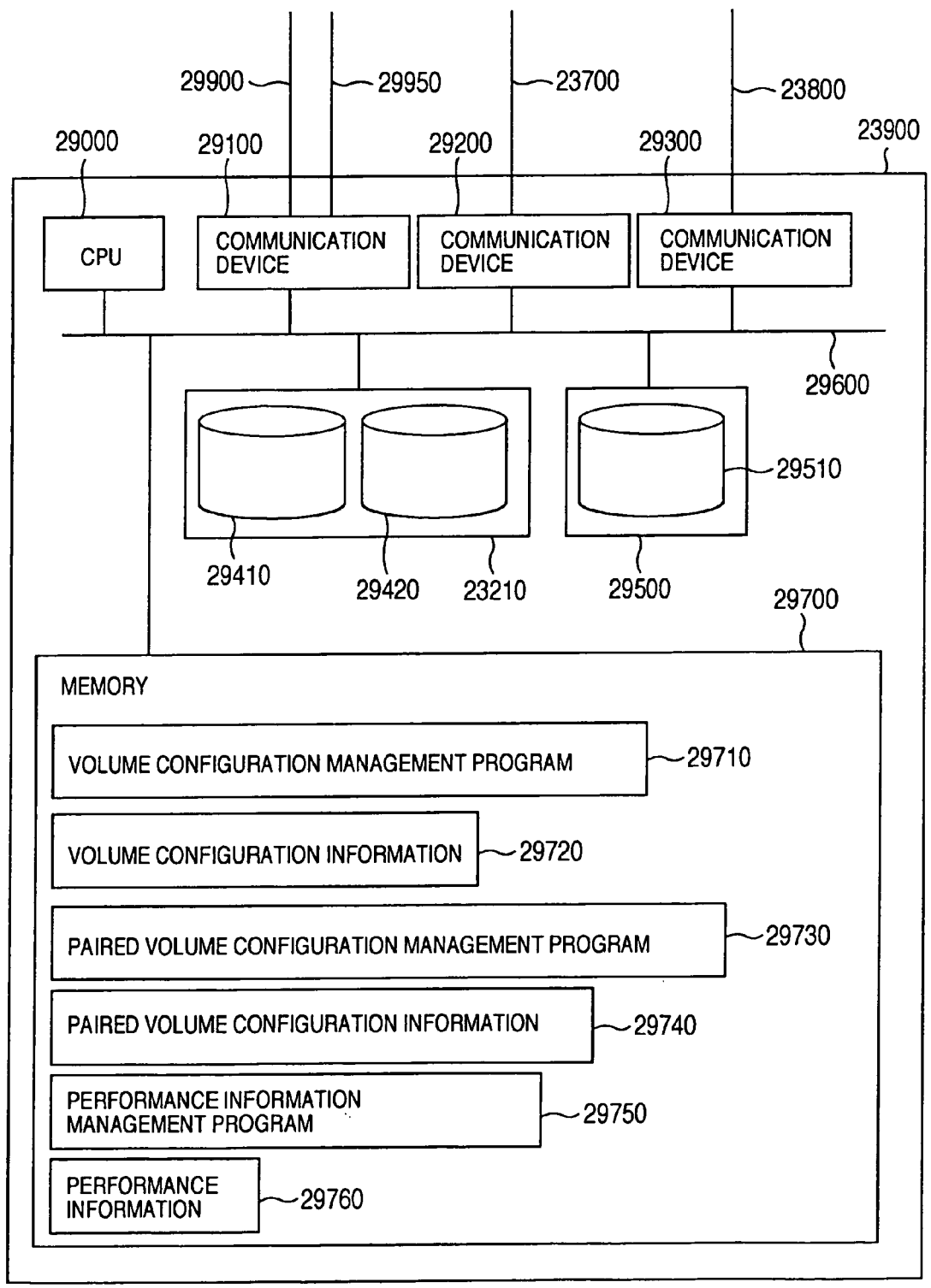
FIG. 29 is a block diagram illustrating the configuration in a storage apparatus 23200 in the sixth embodiment.

FIG. 29 illustrates the configuration in the storage apparatus 23200.

A CPU 29000, communication devices 29100, 29200, 29300, a memory 29700, and parity groups 23210, 29500 are interconnected through a communication path 29600. Further, the communication device 29100 is connected to a communication path 29900 and a communication path 29950; the communication device 29200 to a communication path 23700; and the communication apparatus 29300 to a communication path 23800, respectively. Volumes 29410, 29420 are defined in the parity group 23210, while a volume 29510 is defined in the parity group 29500.

The memory 29700 stores a volume configuration management program 29710, a paired volume configuration management program 29730, a performance information management program 29750, volume configuration information 29720, paired volume configuration information 29740, and performance information 29760. The programs in the memory 29700 reside in any of the volumes 29410, 29420, 29510 which are defined in the storage apparatus 23200, read into the memory 29700, and executed by the CPU 29000. The program modules may be stored on a recording medium (flexible disk, CD-ROM, DVD-ROM, semiconductor memory, transmission paths such as LAN and SAN, or the like) which can be read by the CPU. Alternatively, functions provided by the program modules may be implemented by hardware configurations (semiconductor integrated circuits such as LSI (Large Scaled Integration) and the like).

The volume configuration information 29720 shows the configuration of the volumes in the storage apparatus 23200, and is listed in a table which is in the same format as that shown in FIG. 11.

The volume configuration management program 29710 receives a volume configuration modification request from the volume configuration management program in FIG. 24, and modifies the volume configuration information 29720 when it modifies the volume configuration in response to the request.

The paired volume configuration information 29740 provides information on paired volumes associated with a remote copy performed between a volume in the storage apparatus 23200 and another storage apparatus, and is listed in a table which is in the same format as that shown in FIG. 26.

The paired volume configuration management program 29730 receives a paired volume configuration modification request from the paired volume configuration management program 24460 in FIG. 24, and modifies the paired volume configuration information 29740 when the configuration of paired volumes is modified in response to the request.

The performance information 29760 comprises performance information on the volumes and parity groups in the storage apparatus 23200 which are periodically collected by the performance information management program 29750, and is listed in a table which is in the same format as that shown in FIG. 10.

The performance information management program 29750 returns information in the performance information 29760 in response to a request from the performance information management program 24440, in addition to the foregoing.

Functions provided by two or more of arbitrary programs stored in the memory of the computer 23900 and storage apparatus 23200 may be offered by another program. While the sixth embodiment has been described in connection with a procedure which involves assignment of volumes, performance adjustment, and remote copy, the procedure may involve only the assignment of volumes and the performance adjustment while the remote copy may be separately performed at a later time.

In the sixth embodiment, the paired volume assignment program 24410 examines destinations for all the remaining volumes on the same parity group as the volume B in a sequence of steps 28350-28500. Alternatively, the program 24410 may examine destinations for all the remaining volumes except for the source volume or destination volume of a remote copy, instead of all the remaining volumes, or may store volumes, the performance of which has been adjusted according to the present invention in the past, and examine destinations for all the remaining volumes except for the stored volumes.

In the sixth embodiment, the performance of a volume on the same parity group as the destination volume of a remote copy is predicted by referring the performance prediction table 24490 based on a current average number of requests per unit time. When a volume on the same parity group as the destination volume of a remote copy is the destination volume of the remote copy, predicted performance may be calculated using an average number of requests per unit time to the source volume of the remote copy of the volume as an average number of requests per unit time to the volume after a failover.

The sixth embodiment is implemented on the assumption that at the time the volume A and volume B are defined, the remaining volumes have already been defined so that performance information on the volumes have been acquired. However, when the performance information has not been acquired, for example, when all volumes are newly defined, the processing illustrated in FIG. 28 may be terminated if the conditions are not established at step 28150 on the assumption that the performance cannot be adjusted, rather than continuing the processing from step 28200.

In the sixth embodiments, the volume A and volume B are assigned before the performance is adjusted. Alternatively, the volume A alone may be assigned, and subsequently, the volume A is specified, and the volume B may be defined as a volume which can be predicted to achieve the performance after a failover higher than the performance of the volume A before the failover.

Alternatively, as the volume A alone is assigned and specified for a performance adjustment, the volume B may be defined as a volume which can be predicted to achieve the performance after a failover higher than the performance of the volume A before the failover.

Further alternatively, out of two volumes which are assigned and applied with the same load, the one presenting lower performance may be designated as the volume A, and the remainder as the volume B.

Further alternatively, a search may be made for a parity group A in which previously defined volumes have been all designated as destinations of remote copies, and for a parity group B in which previously defined volumes have been all designated as sources of remote copies, and which includes all source volumes of remote copies of volumes defined on the parity group A. Then, the volume A may be defined in the parity group A, while the volume B may be defined in the parity group B.

As appreciated from the foregoing description, the present invention can prevent a failover type cluster system from a degradation in performance of the overall system after a failover. In addition, when an inter-volume copy is performed using a snapshot function or a remote copy function, smooth processing can be carried out without consuming an extra memory for a data transfer or without waiting for a data write.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A computer system comprising:
a first storage system including plurality of physical disk devices, at least one of which is configured to a first logical volume, and providing a first logical volume with a first computer for storing a first data via a network and,
a second storage system being coupled to the first storage system via a communication line, including a plurality of physical disk devices, at least one of which is configured to a second logical volume, and providing the second logical volume with a second computer via a network, the second logical volume related to the first logical volume with a second computer,
wherein the first storage system transfers, to the second storage system, a second data which is a copy of the first data, and transfers, to the second storage system, a first information related to configuration of the first logical volume when an event related to the first logical volume occurs,
the second storage system stores the second data to the second logical volume when the second data is received from the first storage system via the communication line, and changes configuration of the second logical volume related to the first logical volume when the first information is received via the communication line,
the configuration change of the second logical volume is performed while maintaining the relation that the data of the first logical volume is copied into the second logical volume and the first logical volume accepts access from the first computer to the copied data after the data of the first logical volume is copied to the second logical volume; and
after the configuration of the second logical volume is changed, the data stored in the first logical volume is copied into the second logical volume.

2. A computer system according to claim 1,
wherein the first storage system changes a configuration of the first logical volume when the event that occurs is moving data between the physical disk devices, and the first storage system transfers, to the second storage system, the first information including the changing of the configuration of the first logical volume.

3. A computer system according to claim 2,
wherein the first storage system moves data related to the first logical volume to the second storage physical disk device from the first storage physical disk device, there are different performance characteristics between the first physical disk device and the second physical disk device, the first storage system changes the configuration of the first logical volume, and transfers, to the second storage system via the communication line, the first information including the changing of the configuration of the first logical volume.

4. A computer system according to claim 3,
wherein the second storage system includes a third physical disk device which is configured to the second logical volume and a fourth physical disk device,
when the first information is received, the second storage system moves data in the second logical volume from the third physical disk device to the fourth physical disk device.

5. A computer system according to claim 2, wherein
when the first information is received, the second storage system moves data which has been stored to the second logical volume between the physical disk devices to change a physical disk device corresponding to the second logical volume as the configuration related to the second logical volume.

6. A computer system according to claim 5,
wherein the first information includes information related to first performance of the physical devices of the first storage system, and
wherein the second storage system holds information related to second performance of the physical disk devices of the second storage system and specifies physical disk devices on the basis of the first performance and the second performance when the first information is received.

7. A primary storage system comprising:
a network interface coupled to a secondary storage system via a communication line and a first computer via a network;
a controller coupled to the network interface;
a memory coupled to the controller; and,
a plurality of disk devices at least one of which is configured to a first logical volume which is provided with the secondary storage system and the first computer, the first logical volume being related to one of second logical volumes provided by the secondary storage system;

wherein the controller writes a first data to the physical disk device corresponding to the first logical volume, sends, to the secondary storage system, a copy instruction for storing a second data copy of the first data to the second logical volume, and sends, to the secondary storage system, information related to configuration of the first logical volume when physical disk devices being configured to the first logical volume are changed;

the configuration change of the second logical volume is performed while maintaining the relation that the data of the first logical volume is copied into the second logical volume and the first logical volume accepts access from the first computer to the copied data after the data of the first logical volume is copied to the second logical volume; and after the configuration of the second logical volume is changed, the data stored in the first logical volume is copied into the second logical volume.

8. A secondary storage system comprising:

an network interface coupled to a primary storage system via a communication line and a secondary computer via a network, the primary storage system including the first logical volume provided with a first computer via a network and writing a first data to physical disk devices corresponding to the first logical volume;

a controller is coupled to the network interface;

a memory is coupled to the controller;

a plurality of disk devices at least one of which is configured to a second logical volume being provided with the primary storage systems and the secondary computer, the second logical volume related to the first logical volume;

wherein the memory stores performance information related to performance of physical devices, wherein the controller receives, from the primary storage system via the communication line a copy instruction for storing a second data copied from the first logical volume to the second logical volume, receives from the primary storage system via the communication line, notification related to configuration of the first logical volume when physical disk devices being configured to the first logical volume is changed, and specifies, on the basis of the notification and the performance information, a physical disk device to be configured to the second logical volume, to move the second data between the physical devices in the secondary storage system;

the configuration change of the second logical volume is performed while maintaining the relation that the data of the first logical volume is copied into the second logical volume and the first logical volume accepts access from the first computer to the copied data after the data of the first logical volume is copied to the second logical volume; and after the configuration of the second logical volume is changed, the data stored in the first logical volume is copied into the second logical volume.

9. A computer system comprising:

a first storage system including a plurality of physical disk devices, at least one of which is configured to a first logical volume, and providing a first logical volume with a first computer for storing a first data via a network;

a second storage system being coupled to the first storage system via a network, including a plurality of physical disk devices, at least one of which is configured to a second logical volume, and providing the second logical volume with a second computer via a network, the second logical volume being related to the first logical volume;

wherein the first storage system sends, to the second storage system, a second data which is a copy of the first data, wherein the second storage system stores the second data to the physical disk device configured to the second logical volume when the second data is received from the first storage system via the network, changes the configuration of physical devices related to the second logical volume so that an attribute of the second logical volume is changed, when configuration of the physical disk device related to the first logical volume is changed among physical disk devices in the first storage system, to change an attribute of the first logical volume;

the configuration change of the second logical volume is performed while maintaining the relation that the data of the first logical volume is copied into the second logical volume and the first logical volume accepts access from the first computer to the copied data after the data of the first logical volume is copied to the second logical volume; and after the configuration of the second logical volume is changed, the data stored in the first logical volume is copied into the second logical volume.

10. A computer system according to claim 9, wherein the first storage system includes a plurality of physical disk devices of different performance, and the second storage system includes a plurality of physical disk devices.

11. A method for managing storage systems each of which includes a plurality of physical disk devices to be configured to a logical volume comprising the steps of:

providing a first logical volume configured by the physical disk devices in the first storage system with a host computer a via a network;

copying, to the second storage system from the first storage system via a network, data to be stored by the physical disk devices related to the first logical volume, and changing an attribute of the second logical volume corresponding to an attribute of the first logical volume related to the second logical volume;

performing the configuration change of the second logical volume while maintaining the relation that the data of the first logical volume is copied into the second logical volume and the first logical volume accepts access from the first computer to the copied data after the data of the first logical volume is copied to the second logical volume; and after the configuration of the second logical volume is changed, copying the data stored in the first logical volume into the second logical volume.

* * * * *